US011637762B2

(12) United States Patent
Scheib et al.

(10) Patent No.: US 11,637,762 B2
(45) Date of Patent: *Apr. 25, 2023

(54) MDL-BASED CLUSTERING FOR DEPENDENCY MAPPING

(71) Applicant: Cisco Technology, Inc., San Jose, CA (US)

(72) Inventors: Ellen Christine Scheib, Mountain View, CA (US); Ali Parandehgheibi, Sunnyvale, CA (US); Omid Madani, San Carlos, CA (US); Vimalkumar Jeyakumar, Los Altos, CA (US); Navindra Yadav, Cupertino, CA (US); Mohammadreza Alizadeh Attar, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,100

(22) Filed: Dec. 2, 2020

(65) Prior Publication Data

US 2021/0176145 A1 Jun. 10, 2021

Related U.S. Application Data

(63) Continuation of application No. 16/443,122, filed on Jun. 17, 2019, now Pat. No. 10,917,319, which is a (Continued)

(51) Int. Cl.
*H04L 43/045* (2022.01)
*G06F 3/0482* (2013.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ............ G06F 8/30; G06F 8/456; G06F 17/10; G06F 17/30469; G06F 17/30536;
(Continued)

(56) References Cited

U.S. PATENT DOCUMENTS

| 5,086,385 A | 2/1992 | Launey et al. |
| 5,319,754 A | 6/1994 | Meinecke et al. |

(Continued)

FOREIGN PATENT DOCUMENTS

| CN | 101093452 | 12/2007 |
| CN | 101770551 | 7/2010 |

(Continued)

OTHER PUBLICATIONS

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.

(Continued)

*Primary Examiner* — Aftab N. Khan
(74) *Attorney, Agent, or Firm* — Polsinelli

(57) ABSTRACT

Systems and methods are provided for automatically discovering applications/clusters in a network and mapping dependencies between the applications/clusters. A network monitoring system can capture network flow data using sensors executing on physical and/or virtual servers of the network and sensors executing on networking devices connected to the servers. The system can determine a graph including nodes, representing at least the servers, and edges, between pairs of the nodes of the graph indicating the network flow data includes one or more observed flows between pairs of the servers represented by the pairs of the nodes. The system can determine a dependency map, including representations of clusters of the servers and representations of dependencies between the clusters, based on the
(Continued)

graph. The system can display a first representation of a first cluster of the dependency map and information indicating a confidence level of identifying the first cluster.

18 Claims, 7 Drawing Sheets

Related U.S. Application Data continuation of application No. 15/145,666, filed on May 3, 2016, now Pat. No. 10,326,672.

(60) Provisional application No. 62/171,899, filed on Jun. 5, 2015.

(51) Int. Cl.

| | |
|---|---|
| H04L 41/046 | (2022.01) |
| H04L 9/40 | (2022.01) |
| G06F 9/455 | (2018.01) |
| G06N 20/00 | (2019.01) |
| G06F 21/55 | (2013.01) |
| G06F 21/56 | (2013.01) |
| G06F 16/28 | (2019.01) |
| G06F 16/2457 | (2019.01) |
| G06F 16/248 | (2019.01) |
| G06F 16/29 | (2019.01) |
| G06F 16/16 | (2019.01) |
| G06F 16/17 | (2019.01) |
| G06F 16/11 | (2019.01) |
| G06F 16/13 | (2019.01) |
| G06F 16/174 | (2019.01) |
| G06F 16/23 | (2019.01) |
| G06F 16/9535 | (2019.01) |
| G06N 99/00 | (2019.01) |
| H04L 9/32 | (2006.01) |
| H04L 41/0668 | (2022.01) |
| H04L 43/0805 | (2022.01) |
| H04L 43/0811 | (2022.01) |
| H04L 43/0852 | (2022.01) |
| H04L 43/106 | (2022.01) |
| H04L 45/00 | (2022.01) |
| H04L 45/50 | (2022.01) |
| H04L 67/12 | (2022.01) |
| H04L 43/026 | (2022.01) |
| H04L 61/5007 | (2022.01) |
| H04L 67/01 | (2022.01) |
| H04L 67/51 | (2022.01) |
| H04L 67/75 | (2022.01) |
| H04L 67/1001 | (2022.01) |
| H04L 43/062 | (2022.01) |
| H04L 43/10 | (2022.01) |
| H04L 47/2441 | (2022.01) |
| H04L 41/0893 | (2022.01) |
| H04L 43/08 | (2022.01) |
| H04L 43/04 | (2022.01) |
| H04W 84/18 | (2009.01) |
| H04L 67/10 | (2022.01) |
| H04L 43/0876 | (2022.01) |
| H04L 41/12 | (2022.01) |
| H04L 41/16 | (2022.01) |
| H04L 41/0816 | (2022.01) |
| G06F 21/53 | (2013.01) |
| H04L 41/22 | (2022.01) |
| G06F 3/04842 | (2022.01) |
| G06F 3/04847 | (2022.01) |
| H04L 41/0803 | (2022.01) |
| H04L 43/0829 | (2022.01) |
| H04L 43/16 | (2022.01) |
| H04L 1/24 | (2006.01) |
| H04W 72/08 | (2009.01) |
| H04L 9/08 | (2006.01) |
| H04J 3/06 | (2006.01) |
| H04J 3/14 | (2006.01) |
| H04L 47/20 | (2022.01) |
| H04L 47/32 | (2022.01) |
| H04L 43/0864 | (2022.01) |
| H04L 47/11 | (2022.01) |
| H04L 69/22 | (2022.01) |
| H04L 45/74 | (2022.01) |
| H04L 47/2483 | (2022.01) |
| H04L 43/0882 | (2022.01) |
| H04L 41/0806 | (2022.01) |
| H04L 43/0888 | (2022.01) |
| H04L 43/12 | (2022.01) |
| H04L 47/31 | (2022.01) |
| G06T 11/20 | (2006.01) |
| H04L 43/02 | (2022.01) |
| H04L 47/28 | (2022.01) |
| H04L 69/16 | (2022.01) |
| H04L 45/302 | (2022.01) |
| H04L 67/50 | (2022.01) |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/235* (2019.01); *G06F 16/2322* (2019.01); *G06F 16/2365* (2019.01); *G06F 16/248* (2019.01); *G06F 16/24578* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/556* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/026* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01);

H04L 45/74 (2013.01); H04L 47/11 (2013.01); H04L 47/20 (2013.01); H04L 47/2441 (2013.01); H04L 47/2483 (2013.01); H04L 47/28 (2013.01); H04L 47/31 (2013.01); H04L 47/32 (2013.01); H04L 61/5007 (2022.05); H04L 63/0227 (2013.01); H04L 63/0263 (2013.01); H04L 63/06 (2013.01); H04L 63/0876 (2013.01); H04L 63/145 (2013.01); H04L 63/1408 (2013.01); H04L 63/1416 (2013.01); H04L 63/1425 (2013.01); H04L 63/1433 (2013.01); H04L 63/1441 (2013.01); H04L 63/1458 (2013.01); H04L 63/1466 (2013.01); H04L 63/16 (2013.01); H04L 63/20 (2013.01); H04L 67/01 (2022.05); H04L 67/10 (2013.01); H04L 67/1001 (2022.05); H04L 67/12 (2013.01); H04L 67/51 (2022.05); H04L 67/75 (2022.05); H04L 69/16 (2013.01); H04L 69/22 (2013.01); H04W 72/08 (2013.01); H04W 84/18 (2013.01); G06F 2009/4557 (2013.01); G06F 2009/45587 (2013.01); G06F 2009/45591 (2013.01); G06F 2009/45595 (2013.01); G06F 2221/033 (2013.01); G06F 2221/2101 (2013.01); G06F 2221/2105 (2013.01); G06F 2221/2111 (2013.01); G06F 2221/2115 (2013.01); G06F 2221/2145 (2013.01); H04L 67/535 (2022.05)

(58) Field of Classification Search
CPC ...... G06F 9/455; G06F 21/31; G06F 9/45533; H04L 45/04; H04L 45/302; H04L 45/46; H04L 45/50; H04L 9/3213; H04L 63/0807; H04L 63/0815; H04L 63/08; H04L 63/14; H04L 41/12; H04L 43/0817
See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,085,243 A | 7/2000 | Fletcher et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |

(56) References Cited

U.S. PATENT DOCUMENTS

| | | |
|---|---|---|
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 10,116,531 B2 | 10/2018 | Alizadeh Attar et al. |
| 10,171,319 B2 | 1/2019 | Yadav et al. |
| 10,454,793 B2 | 10/2019 | Deen et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1* | 8/2002 | Koller .................. G06F 16/2462 |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0205536 A1 | 10/2004 | Newman et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0060403 A1 | 3/2005 | Bernstein et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |

(56) References Cited

U.S. PATENT DOCUMENTS

| | | |
|---|---|---|
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1* | 8/2006 | Newport ............. H04L 41/12 |
| 2006/0212556 A1 | 9/2006 | Yacoby et al. |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0180526 A1 | 8/2007 | Copeland, III |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1* | 9/2007 | Mitchell ............. H04L 45/50 370/238 |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0201109 A1 | 8/2008 | Zill et al. |
| 2008/0250122 A1 | 10/2008 | Zsigmond et al. |
| 2008/0250128 A1 | 10/2008 | Sargent |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0106646 A1 | 4/2009 | Mollicone et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1* | 6/2010 | Komatsu ............... G06F 8/30 717/107 |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1* | 4/2011 | Komatsu ............... G06F 8/456 717/149 |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1* | 5/2011 | Anderson ............. H04L 63/08 726/8 |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0047394 A1* | 2/2012 | Jain ................... G06F 11/2028 714/4.11 |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |

(56) References Cited

U.S. PATENT DOCUMENTS

| | | |
|---|---|---|
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1* | 11/2012 | Lin .................. G06F 17/10 702/85 |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0166730 A1 | 6/2013 | Wilkinson |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0332773 A1* | 12/2013 | Yuan .................. G05B 23/0205 714/26 |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0136680 A1 | 5/2014 | Joshi et al. |
| 2014/0137109 A1 | 5/2014 | Sharma et al. |
| 2014/0140213 A1 | 5/2014 | Raleigh et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0247206 A1* | 9/2014 | Grokop .................. G06F 1/3287 345/156 |
| 2014/0269777 A1 | 9/2014 | Rothstein et al. |
| 2014/0280499 A1 | 9/2014 | Basavaiah et al. |
| 2014/0280908 A1 | 9/2014 | Rothstein et al. |
| 2014/0281030 A1 | 9/2014 | Cui et al. |
| 2014/0286174 A1 | 9/2014 | Iizuka et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0301213 A1 | 10/2014 | Khanal et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |

(56) References Cited

U.S. PATENT DOCUMENTS

| | | |
|---|---|---|
| 2015/0261886 A1* | 9/2015 | Wu .................. G06F 16/285 707/798 |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0148251 A1 | 5/2016 | Thomas et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0234083 A1 | 8/2016 | Ahn et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubal et al. |
| 2016/0380869 A1 | 12/2016 | Shen et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0324518 A1 | 11/2017 | Meng et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0005427 A1* | 1/2018 | Marvie .................. G06T 1/60 |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Arista Networks, Inc., "Application Visibility and Network Telemtry using Splunk," Arista White Paper, Nov. 2013, 11 pages.

Aydin, et al., "Architecture and Implementation of a Scalable Sensor Data Storage and Analysis System Using Cloud Computing and Big Data Technologies," Journal of Sensors, vol. 2015, pp. 1-11.

(56) References Cited

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Backes, Michael, et al., "Data Lineage in Malicious Environments," IEEE 2015, pp. 1-13.

Baek, Kwang-Hyun, et al., "Preventing Theft of Quality of Service on Open Platforms," 2005 Workshop of the 1$^{st}$ International Conference on Security and Privacy for Emerging Areas in Communication Networks, 2005, 12 pages.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Bosch, Greg, "Virtualization," 2010, 33 pages.

Breen, Christopher, "MAC 911, How to dismiss Mac App Store Notifications," Macworld.com, Mar. 24, 2014, 3 pages.

Brocade Communications Systems, Inc., "Chapter 5—Configuring Virtual LANs (VLANs)," Jun. 2009, 38 pages.

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chou, C.W., et al., "Optical Clocks and Relativity," Science vol. 329, Sep. 24, 2010, pp. 1630-1633.

Cisco Systems, "Cisco Network Analysis Modules (NAM) Tutorial," Cisco Systems, Inc., Version 3.5.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Addressing Compliance from One Infrastructure: Cisco Unified Compliance Solution Framework," 2014.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Application Dependency Mapping Service," 2009.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: *Using Autoinstall and Setup*,"Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

Cisco Systems, Inc., "Quick Start Guide, Cisco ACE 4700 Series Application Control Engine Appliance," Software Ve740rsion A5(1.0), Sep. 2011, 138 pages.

Cisco Systems, Inc., "Routing and Bridging Guide, Cisco ACE Application Control Engine," Software Version A5(1.0), Sep. 2011, 248 pages.

Cisco Systems, Inc., "VMWare and Cisco Virtualization Solution: Scale Virtual Machine Networking," Jul. 2009, 4 pages.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Systems, Inc., "Cisco Application Visibility and Control," Oct. 2011, 2 pages.

Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.

Cisco Systems, Inc., "Cisco Tetration Platform Data Sheet", Updated Mar. 5, 2018, 21 pages.

Cisco Technology, Inc., "Cisco IOS Software Release 12.4T Features and Hardware Support," Feb. 2009, 174 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Cisco Systems, Inc., "Cisco Application Control Engine (ACE) Troubleshooting Guide—Understanding the ACE Module Architecture and Traffic Flow," Mar. 11, 2011, 6 pages.

Costa, Raul, et al., "An Intelligent Alarm Management System for Large-Scale Telecommunication Companies," In Portuguese Conference on Artificial Intelligence, Oct. 2009, 14 pages.

De Carvalho, Tiago Filipe Rodrigues, "Root Cause Analysis in Large and Complex Networks," Dec. 2008, Repositorio.ul.pt, pp. 1-55.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Duan, Yiheng, et al., Detective: Automatically Identify and Analyze Malware Processes in Forensic Scenarios via DLLs, IEEE ICC 2015—Next Generation Networking Symposium, pp. 5691-5696.

Feinstein, Laura, et al., "Statistical Approaches to DDoS Attack Detection and Response," Proceedings of the DARPA Information Survivability Conference and Exposition (DISCEX '03), Apr. 2003, 12 pages.

Foundation for Intelligent Physical Agents, "FIPA Agent Message Transport Service Specification," Dec. 3, 2002, http://www.fipa.org; 15 pages.

George, Ashley, et al., "NetPal: A Dynamic Network Administration Knowledge Base," 2008, pp. 1-14.

Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Heckman, Sarah, et al., "On Establishing a Benchmark for Evaluating Static Analysis Alert Prioritization and Classification Techniques," IEEE, 2008; 10 pages.

Hewlett-Packard, "Effective use of reputation intelligence in a security operations center," Jul. 2013, 6 pages.

Hideshima, Yusuke, et al., "STARMINE: A Visualization System for Cyber Attacks," https://www.researchgate.net/publication/221536306, Feb. 2006, 9 pages.

Huang, Hing-Jie, et al., "Clock Skew Based Node Identification in Wireless Sensor Networks," IEEE, 2008, 5 pages.

(56) References Cited

OTHER PUBLICATIONS

InternetPerils, Inc., "Control Your Internet Business Risk," 2003-2015, https://www.internetperils.com.

Ives, Herbert, E., et al., "An Experimental Study of the Rate of a Moving Atomic Clock," Journal of the Optical Society of America, vol. 28, No. 7, Jul. 1938, pp. 215-226.

Janoff, Christian, et al., "Cisco Compliance Solution for HIPAA Security Rule Design and Implementation Guide," Cisco Systems, Inc., Updated Nov. 14, 2015, part 1 of 2, 350 pages.

Janoff, Christian, et al., "Cisco Compliance Solution for HIPAA Security Rule Design and Implementation Guide," Cisco Systems, Inc., Updated Nov. 14, 2015, part 2 of 2, 588 pages.

Joseph, Dilip, et al., "Modeling Middleboxes," IEEE Network, Sep./Oct. 2008, pp. 20-25.

Kent, S., et al. "Security Architecture for the Internet Protocol," Network Working Group, Nov. 1998, 67 pages.

Kerrison, Adam, et al., "Four Steps to Faster, Better Application Dependency Mapping—Laying the Foundation for Effective Business Service Models," BMCSoftware, 2011.

Kim, Myung-Sup, et al. "A Flow-based Method for Abnormal Network Traffic Detection, " IEEE, 2004, pp. 599-612.

Kraemer, Brian, "Get to know your data center with CMDB," TechTarget, Apr. 5, 2006, http://searchdatacenter.techtarget.com/news/118820/Get-to-know-your-data-center-with-CMDB.

Lab SKU, "VMware Hands-on Labs—HOL-SDC-1301" Version: 20140321-160709, 2013; http://docs.hol.vmware.com/HOL-2013/holsdc-1301_html_en/ (part 1 of 2).

Lab SKU, "VMware Hands-on Labs—HOL-SDC-1301" Version: 20140321-160709, 2013; http://docs.hol.vmware.com/HOL-2013/holsdc-1301_html_en/ (part 2 of 2).

Lachance, Michael, "Dirty Little Secrets of Application Dependency Mapping," Dec. 26, 2007.

Landman, Yoav, et al., "Dependency Analyzer," Feb. 14, 2008, http://ifrog.com/confluence/display/DA/Home.

Lee, Sihyung, "Reducing Complexity of Large-Scale Network Configuration Management," Ph.D. Dissertation, Carniege Mellon University, 2010.

Li, Ang, et al., "Fast Anomaly Detection for Large Data Centers," Global Telecommunications Conference (GLOBECOM 2010, Dec. 2010, 6 pages.

Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.

Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.

Lu, Zhonghai, et al., "Cluster-based Simulated Annealing for Mapping Cores onto 2D Mesh Networks on Chip," Design and Diagnostics of Electronic Circuits and Systems, pp. 1, 6, Apr. 16-18, 2008.

Matteson, Ryan, "Depmap: Dependency Mapping of Applications Using Operating System Events: a Thesis," Master's Thesis, California Polytechnic State University, Dec. 2010.

Miller, N., et al., "Collecting network status information for network-aware applications," Proceedings IEEE Infocom 2000. vol. 2, 2000, pp. 641-650.

Natarajan, Arun, et al., "NSDMiner: Automated Discovery of Network Service Dependencies," Institute of Electrical and Electronics Engineers INFOCOM, Feb. 2012, 9 pages.

Navaz, A.S. Syed, et al., "Entropy based Anomaly Detection System to Prevent DDoS Attacks in Cloud," International Journal of Computer Applications (0975-8887), vol. 62, No. 15, Jan. 2013, pp. 42-47.

Neverfail, "Neverfail IT Continuity Architect," 2015, https://web.archive.org/web/20150908090456/http://www.neverfailgroup.com/products/it-continuity-architect.

Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.

Nunnally, Troy, et al., "P3D: A Parallel 3D Coordinate Visualization for Advanced Network Scans," IEEE 2013, Jun. 9-13, 2013, 6 pages.

O'Donnell, Glenn, et al., "The CMDB Imperative: How to Realize the Dream and Avoid the Nightmares," Prentice Hall, Feb. 19, 2009.

Ohta, Kohei, et al., "Detection, Defense, and Tracking of Internet-Wide Illegal Access in a Distributed Manner," 2000, pp. 1-16.

Online Collins English Dictionary, 1 page (Year: 2018).

Pathway Systems International Inc., "How Blueprints does Integration," Apr. 15, 2014, 9 pages, http://pathwaysystems.com/company-blog/.

Pathway Systems International Inc., "What is Blueprints?" 2010-2016, http://pathwaysystems.com/blueprints-about/.

Popa, Lucian, et al., "Macroscope: End-Point Approach to Networked Application Dependency Discovery," CoNEXT'09, Dec. 1-4, 2009, Rome, Italy, 12 pages.

Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.

Sachan, Mrinmaya, et al., "Solving Electrical Networks to incorporate Supervision in Random Walks," May 13-17, 2013, pp. 109-110.

Sammarco, Matteo, et al., "Trace Selection for Improved WLAN Monitoring," Aug. 16, 2013, pp. 9-14.

Shneiderman, Ben, et al., "Network Visualization by Semantic Substrates," Visualization and Computer Graphics, vol. 12, No. 5, pp. 733,740, Sep.-Oct. 2006.

Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.

Thomas, R., "Bogon Dotted Decimal List," Version 7.0, Team Cymru NOC, Apr. 27, 2012, 5 pages.

Voris, Jonathan, et al., "Bait and Snitch: Defending Computer Systems with Decoys," Columbia University Libraries, Department of Computer Science, 2013, pp. 1-25.

Wang, Ru, et al., "Learning directed acyclic graphs via bootstarp aggregating," 2014, 47 pages, http://arxiv.org/abs/1406.2098.

Wang, Yongjun, et al., "A Network Gene-Based Framework for Detecting Advanced Persistent Threats," Nov. 2014, 7 pages.

Witze, Alexandra, "Special relativity aces time trial, 'Time dilation' predicted by Einstein confirmed by lithium ion experiment," Nature, Sep. 19, 2014, 3 pages.

Woodberg, Brad, "Snippet from Juniper SRX Series" Jun. 17, 2013, 1 page, O'Reilly Media, Inc.

Zatrochova, Zuzana, "Analysis and Testing of Distributed NoSQL Datastore Riak," Spring, 2015, 76 pages.

Zeng, Sai, et al., "Managing Risk in Multi-node Automation of Endpoint Management," 2014 IEEE Network Operations and Management Symposium (NOMS), 2014, 6 pages.

Zhang, Yue, et al., "CANTINA: A Content-Based Approach to Detecting Phishing Web Sites," May 8-12, 2007, pp. 639-648.

\* cited by examiner

MDL-BASED CLUSTERING FOR DEPENDENCY MAPPING

CROSS-REFERENCE TO RELATED APPLICATION

This application is a Continuation of U.S. application Ser. No. 16/443,122, filed on Jun. 17, 2019, which in turn, is a Continuation of U.S. application Ser. No. 15/145,666, filed on May 3, 2016, now U.S. Pat. No. 10,326,672, which in turn, claims priority to U.S. Provisional Application 62/171,899, filed at Jun. 5, 2015, the contents of which are incorporated herein by reference in their entireties.

TECHNICAL FIELD

The subject matter of this disclosure relates in general to the field of computer networks, and more specifically for discovering applications and their interdependencies within a computer network.

BACKGROUND

An enterprise application is a set of workloads (e.g., computing, networking, and storage) that are generally distributed across various nodes (or endpoints) of a network and the relationships (e.g., connectivity, dependencies, network and security policies, etc.) between the workloads. A typical application may include a presentation tier, an application tier, and a data tier. The presentation tier may depend on the application tier and authentication services, and the application tier may depend on the web tier and external network services (e.g., a travel reservation system, an ordering tool, a billing tool, etc.). These tiers may further depend on firewall, load balancing, wide area network (WAN) acceleration, and other network services. An enterprise can include hundreds or thousands of applications of similar and different architectures.

An expansive or thorough understanding of a data center and applications running in the data center can be critical for network management tasks such as anomaly detection (e.g., network attacks and misconfiguration), asset management (e.g., monitoring, capacity planning, consolidation, migration, and continuity planning), and compliance (e.g. conformance with governmental regulations, industry standards, and corporate policies). Despite the complexities of the interrelationships among workloads discussed above, the traditional approaches for developing insight into an enterprise's workloads require comprehensive knowledge on the part of human operators and processes that are manual and largely customized for a particular enterprise. Automation of application dependency mapping (ADM) may be preferred because manual procedures often require a substantial degree of expertise yet may still be highly susceptible to error. Further, the evolving practices of modern data centers (e.g., virtualization, cloud computing, support for the Internet of Things (IoT), etc.), the increasing number and complexity of threats against networks, and new regulatory regimes that impose ever harsher penalties on non-compliant corporations demand new solutions for network management in the data center.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
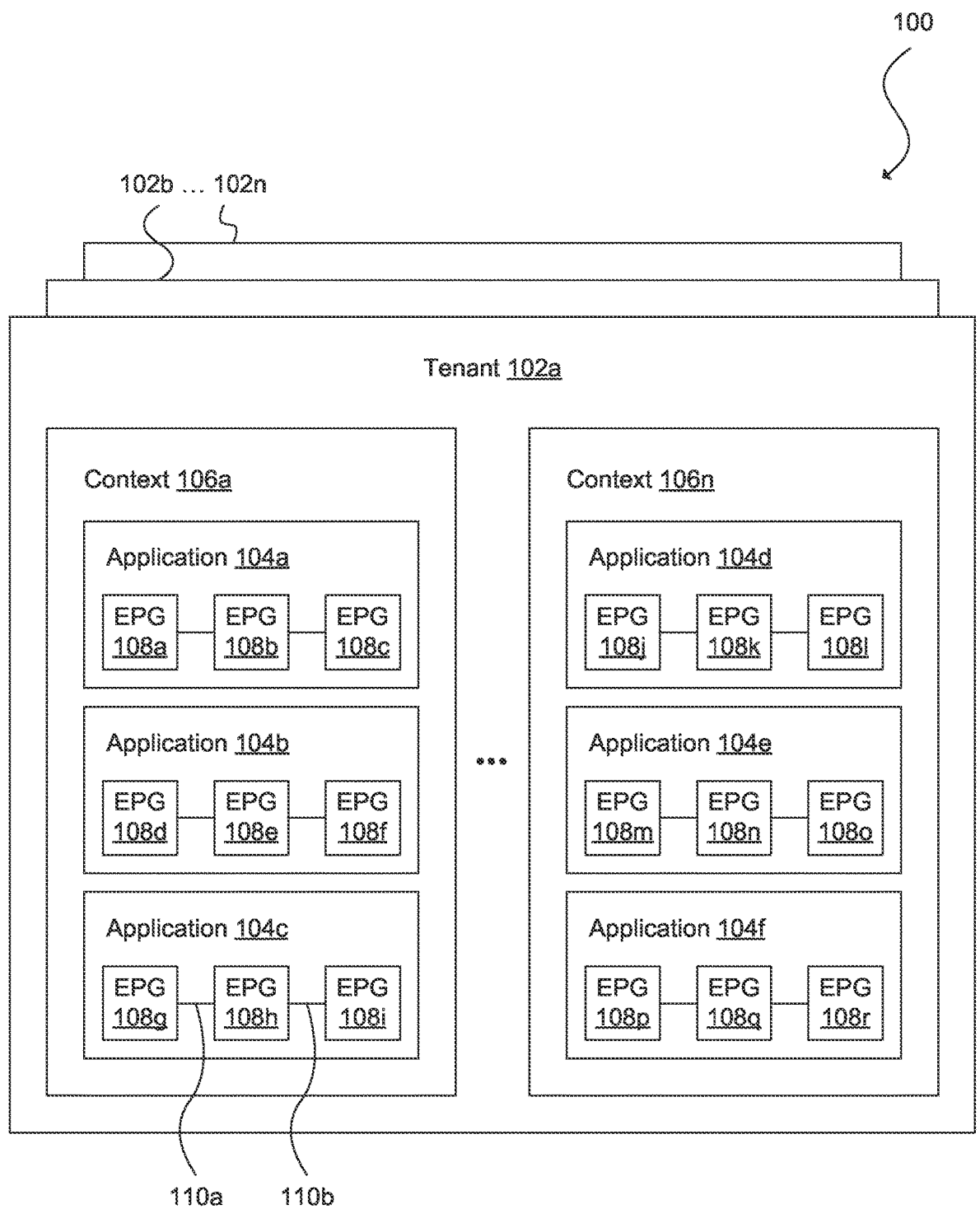
FIG. 1 illustrates an example of a logical object model in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A network can be configured to automate discovery of applications running in the network and map the applications' interdependencies. For example, the network can determine an optimum number of clusters for the network using the minimum description length (MDL) principle. The network can monitor network traffic and associated information (e.g., host information, process information, user information, etc.) passing through the network using a sensor network that provides multiple perspectives for the network traffic and associated information. The sensor network can include sensors for networking devices (e.g., routers, switches, network appliances), physical servers, hypervisors or shared kernels, and virtual partitions (e.g., VMs or containers), and other network elements. The network can analyze the network traffic and associated information to generate a graph. The nodes of the graph can include source endpoints, destination endpoints, and destination endpoint ports identified in the network traffic and associated information. The edges of the graph can include observed flows from the source endpoints to the destination endpoints at the destination ports. Each potential clustering can be evaluated according to an MDL score. The MDL score for a particular clustering can be based on description length values for each cluster combination of the clustering (e.g., source-destination-port combination). The description length value of a particular cluster combination can be based on a number of observed edges of the graph and unobserved edges of the graph corresponding to the cluster combination. The optimum number of clusters for the network may correspond to the number of clusters of the clustering associated with the minimum MDL score.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Network administrators often define and enforce policies to address network security, resource management, and other administrative functions. Conventional policies comprise of access control lists (ACLs) that establish whether certain types of traffic are allowed or denied by the network. A traditional implementation of policies involves their manual configuration using a device-centric model. For example, policies in such systems set forth rules that are to be applied to ports or IP addresses available on a host. Such an approach, however, runs a high risk of security breaches in the event of policy misconfiguration. In addition to the vulnerabilities exposed by human error, misconfiguration can also stem from lack of awareness regarding application context. For example, organizations may have tens of thousands to millions of access control lists (ACLs) and firewall rules. These organizations often lack the operational procedures to remove these policies in a timely manner when applications are decommissioned and/or these organizations prefer to retain policies that are no longer applicable because they are uncertain about the potential effect of removal.

Another common policy management scheme utilizes a virtualization-centric model, but systems relying on this design fail to address applications not running as virtual machines, containers, or other types of virtual partitions. Further, systems that enforce policy via hypervisors, shared kernels, or similar virtualization software require traffic pass through multiple policy enforcement points (e.g., source virtual machine or container, destination virtual machine or container, firewall, etc.). This routing can introduce additional overhead and opacity for inter-application connections.

Other conventional methods for administering policy rely on manual service chaining and a static network topology that is bound to network connections, VLAN, network interface, IP addressing, etc. This model requires policy configuration across multiple security devices (e.g., firewalls and intrusion detection and prevention systems (IDSs and IPSs)), slows application deployment, and scales poorly because applications are frequently created, moved, and decommissioned in the modern data center.

In some embodiments, a data center can implement an application-centric policy management model that facilitates seamless migration of applications and their corresponding policies, significantly reduces security risks, and ensures compliance in real time or substantially real time, among other features and benefits. FIG. 1 illustrates an example of a logical object model 100 for representing an application-centric policy management model in accordance with an embodiment. The policy management model 100 may utilize the concept of tenancy to allow for segregation of network infrastructure administration and traffic flow. Tenants 102a, 102b, . . . 102n (collectively, "102") can be logical containers or folders for applications 104a, 104b, . . . 104f (collectively, "104"). The tenants can represent distinct customers (e.g., users of an infrastructure as a service (IaaS) provider), business units (e.g., human resources and sales), or other logical divisions (e.g., executives, employees, and contractors) depending on organizational needs. It will be appreciated that various configurations are possible. For example, an enterprise may be organized as one tenant for the entire organization, while a public cloud provider may have some customers represented as single tenants and other customers associated with multiple tenants.

The tenants 102 may be further broken down into private Layer 3 (L3) networks or contexts 106a, 106b, . . . 106n (collectively, "106"), which can map to Virtual Route Forwarding (VRF) instances or separate IP spaces. Each tenant 102 may have one or more private L3 networks or contexts 106 depending on their business needs. The private L3 networks or contexts 106 can provide each tenant 102 with a way to further separate its organizational and forwarding requirements. As the contexts 106 can use separate forwarding instances, IP addressing may be duplicated in separate contexts for the purpose of multitenancy.

In some embodiments, each "normal" tenant 102 can represent a unit of isolation from a policy perspective but may not necessarily represent a private network. For example, a "special" common tenant can have sharable policies that can be used by all of the tenants 102. The contexts 106, on the other hand, may represent private L3 namespaces or L3 networks, and can be units of isolation in the policy management model 100. Each tenant 102 can rely on several contexts 106. The contexts 106 can be instantiated by a tenant (i.e., contained by the tenant) or can be a part of a common tenant. This approach provides flexibility for networks by allowing both multiple private L3 networks per tenant and shared L3 networks used by multiple tenants.

Within each context 106 are objects called endpoint groups (EPGs) 108a, 108b, 108r (collectively, "108") that define the applications 104. The EPGs 108 can be a collection of similar endpoints representing an application tier or set of services. The EPGs 108 are connected to each other via policies 110a, 110b, 110n (collectively, "110") (labeled only for the application 102c for clarity and simplicity). In the policy management model 100, the policies 100 can be more than just a set of ACLs and can include a collection of inbound/outbound filters, traffic quality settings, marking rules/redirection rules, and Layers 4-7 service device graphs.

The EPGs 108 are collections of one or more endpoints that provide a logical grouping for objects that require similar policy. For example, the EPGs 108a, 108b, and 108c can be the group of components that respectively make up the web tier, application tier, and data tier of the application 108a (e.g., a website or web service). Endpoints themselves can be defined using NIC, vNIC, IP address, or DNS name with extensibility for future methods of identifying application components. The EPGs 108 can also be used to represent other network elements such as external networks, network services, security devices, network storage, or other groupings. For example, an EPG can comprise endpoints connected to a virtual local area network (VLAN) or virtual extensible local area network (VXLAN), endpoints mapped to a port group, port profile, or other network virtualization grouping, endpoints corresponding to a set of IP addresses or subnets, endpoints corresponding to a set of domain names or domain name ranges, etc.

The use of the policy management model 100 can provide various advantages. The EPGs 108 can act as a single policy enforcement point for a group of network elements. This can simplify configuration of the policies 110 and ensure their consistency. Additional policy can be applied based on EPG rather than subnet as in conventional techniques. This means that IP addressing changes to an endpoint do not necessarily change the endpoint's policy, which is common in the case of conventional networks. In addition, moving an endpoint to another EPG can cause the switch, to which the endpoint is connected, to apply a new policy that defines new behavior for that endpoint based on the new EPG.

An additional benefit of the EPGs 108 relates to how policy may be enforced for an EPG. The physical ternary content-addressable memory (TCAM) in a switch, router, or other networking device where policy is stored for enforcement can be an expensive component of hardware and can therefore lower policy scale and/or raise hardware costs. Further, a policy table implemented in software using a conventional policy model may require more computing, storage, and network resources. Using the policy management model 100, policy can be applied via the hardware fabric (and/or software) based on EPG rather than on endpoint to substantially reduce the size of the TCAM/policy table. For example, the size of a set of policies stored in the TCAM/policy table can be represented as s×d×a, where 's' is the number of sources, is the number of destinations, and 'a' is the number of network actions (e.g., forward, drop, mark for quality of service (QoS), etc.). In the policy management model 100, the sources 's' and destinations become one entry for an EPG. On the other hand, if there are five sources, four destinations, and five network actions for a conventional network, the conventional TCAM/policy table would require 100 policy entries.

A related advantage of the policy management model 100 over traditional systems concerns how the policies 110 can be defined in each system, such as whether policies are based on blacklist rules or whitelist rules. In a blacklist system, traffic is permitted as a matter of course unless there is a policy that explicitly prohibits traffic between endpoints. A whitelist system, on the other hand, denies traffic between endpoints unless there is a policy that explicitly allows traffic. As will be appreciated by one of ordinary skill, a whitelist system in which the default behavior is to prohibit data flow is inherently more secure than a blacklist system in which the default behavior is to allow data flow. Due to the limitations of the size of conventional policy tables discussed above, conventional networks are generally limited to a blacklist system because, for typical enterprises, the set of connections between endpoints that must be allowed is likelier to exceed the set of known connections that must be explicitly denied. The policy management model 100 does not suffer from the same restrictions and can support both policies based on blacklist rules or, preferably, policies based on whitelist rules.

Although there are many favorable characteristics of the policy management model 100 (or a similar application-centric model) over conventional networks, network administrators of traditional systems may be reluctant to commit to such a migration. Data centers can be complicated ecosystems built up over long periods of time (e.g., 5-10 years) with very little documentation or oversight, and siloed network and application teams have often been given the freedom to operate according to different standards (to the extent any exist). Thus, there are few people—if any—in an organization who may have extensive or comprehensive knowledge of their network and the interdependencies between network elements. Further, as discussed, an enterprise's policy set may run into the thousands or even millions. The ramifications of modifying an existing policy, let alone a wholesale migration from one policy set to another, can be another significant deterrent. Yet change may be necessary in view of the dynamic nature of applications in the modern data center in which workloads can migrate from host to host within a private network (e.g., virtualization) or from a private cloud to a public cloud or vice versa (e.g., hybrid cloud computing). In addition, manual processes may no longer be feasible in view of the vastness and complexities of modern networks. Systems and approaches in accordance with various embodiments may ease the frictions of migrating to an application-centric policy management model or facilitate building a data center from the ground up using the policy management model 100 or a similar model.

In some embodiments, application dependency mapping (ADM) can be substantially automated or entirely automated by observing data center traffic for a specified period of time. The traffic data can be collected from multiple perspectives to develop a more thorough data set from which to discover applications and their dependencies. The traffic data can be captured and processed in real time or substantially real time to accurately map endpoints to applications even when the endpoints migrate from host to host due to virtualization and/or cloud computing. The collected data can be evaluated using machine learning to determine an accurate and complete (or nearly complete) ADM. A set of policies, such as those based on whitelist rules, can be derived from the ADM. The policies can be simulated against historical ground truth traffic data and/or real time (or substantially real time) ground truth traffic data to determine their efficacy prior to implementing them in a production environment.

Conventional automated solutions, to the extent they exist, are traditionally limited to packet data captured by networking devices. In some embodiments, networks can be configured with sensors at multiple points, including on networking devices (e.g., switches, routers, gateways, firewalls, deep packet inspectors, traffic monitors, load balancers, etc.), physical servers, hypervisors or shared kernels, virtual partitions (e.g., VMs or containers), and other network elements. This can provide a more comprehensive view of the network. Further, network traffic data (e.g., flows) can be associated with host and/or endpoint data (e.g., host/endpoint name, operating system, CPU usage, network usage, disk space, logged users, scheduled jobs, open files, information regarding files stored on a host/endpoint, etc.), process data (e.g., process name, ID, parent process ID, path, CPU utilization, memory utilization, etc.), user data (e.g., user name, ID, login time, etc.), and other collectible data to provide more insight into network activity.

Conventional approaches may also be limited to networks with stationary nodes. As discussed, this is unworkable in modern data centers which may migrate virtual partitions (e.g., VMs or containers) from host to host both internally (i.e., within the data center) and externally (i.e., to and from a public cloud) in the event of a network or server failure or to balance workloads in the data center. In some embodiments, a data center captures network traffic data and associated host, process, and/or user data in real time or substantially real time and analyzes the captured network data to determine an up-to-date application topology.

An integral task of application dependency mapping is clustering or identifying endpoints performing similar workloads, communicating with a similar set of endpoints or networking devices, having similar network and security limitations (i.e., policies), and sharing other attributes. One of the difficulties of automating ADM is determining the optimal number of clusters and clustering in a network. If the number of clusters is too low and/or the clustering too broad, policies derived from such a clustering may be too "loose" and allow more communications between nodes than would be preferred. On the other hand, if there are too many clusters and/or too many narrowly defined clusters, policies generated from "excessive" clustering may be too costly to implement in hardware and/or software. Further, certain valid communications may be denied if the date/time range of the traffic data analyzed does not include instances of the valid communications.

In some embodiments, the minimum description length (MDL) principle can be utilized to determine the optimal number of clusters in a network. Under the MDL principle, the optimal theory or model for a body of data is the one that minimizes the size of the theory and the amount of information necessary to specify the exceptions relative to the theory. MDL posits that any regularity in the data can be used to compress (i.e., to describe it using fewer symbols than the number of symbols needed to describe the data literally) the data. Thus, the more regularities there are in the data, the more the data can be compressed. In MDL, learning is equivalent to finding regularity; the more that the data can be compressed, the more is learned about the data.

In some embodiments, potential clusterings can be compared to a communication graph comprising graph nodes (e.g., clients, servers, and server ports) and graph edges corresponding to observed flows that can be evaluated according to an MDL score to determine the optimal number of clusters. The MDL score for a particular clustering can be based on the sum of the description lengths for each cluster combination of the clustering (e.g., a source cluster—destination cluster—destination port combination). In some embodiments, the description length can be a function of the minimum between observed graph edges (i.e., collected traffic data includes data flows from a source cluster to a destination cluster at a port cluster) and unobserved graph edges (i.e., collected traffic data does not include data flows from a source cluster to a destination cluster at a port cluster).

In some embodiments, a network may comprise multiple partitions (e.g., based on routing information, subnet masks, or regions and zones), and clusters may not span the multiple partitions (i.e., a cluster may not include endpoints that are located in different partitions). Thus, the optimal clustering may vary from one partition to another in networks with multiple partitions. In some embodiments, the MDL principle can be used to improve the number of clusters for each individual partition by using a randomized local search algorithm based upon local searches.

Figure 2:
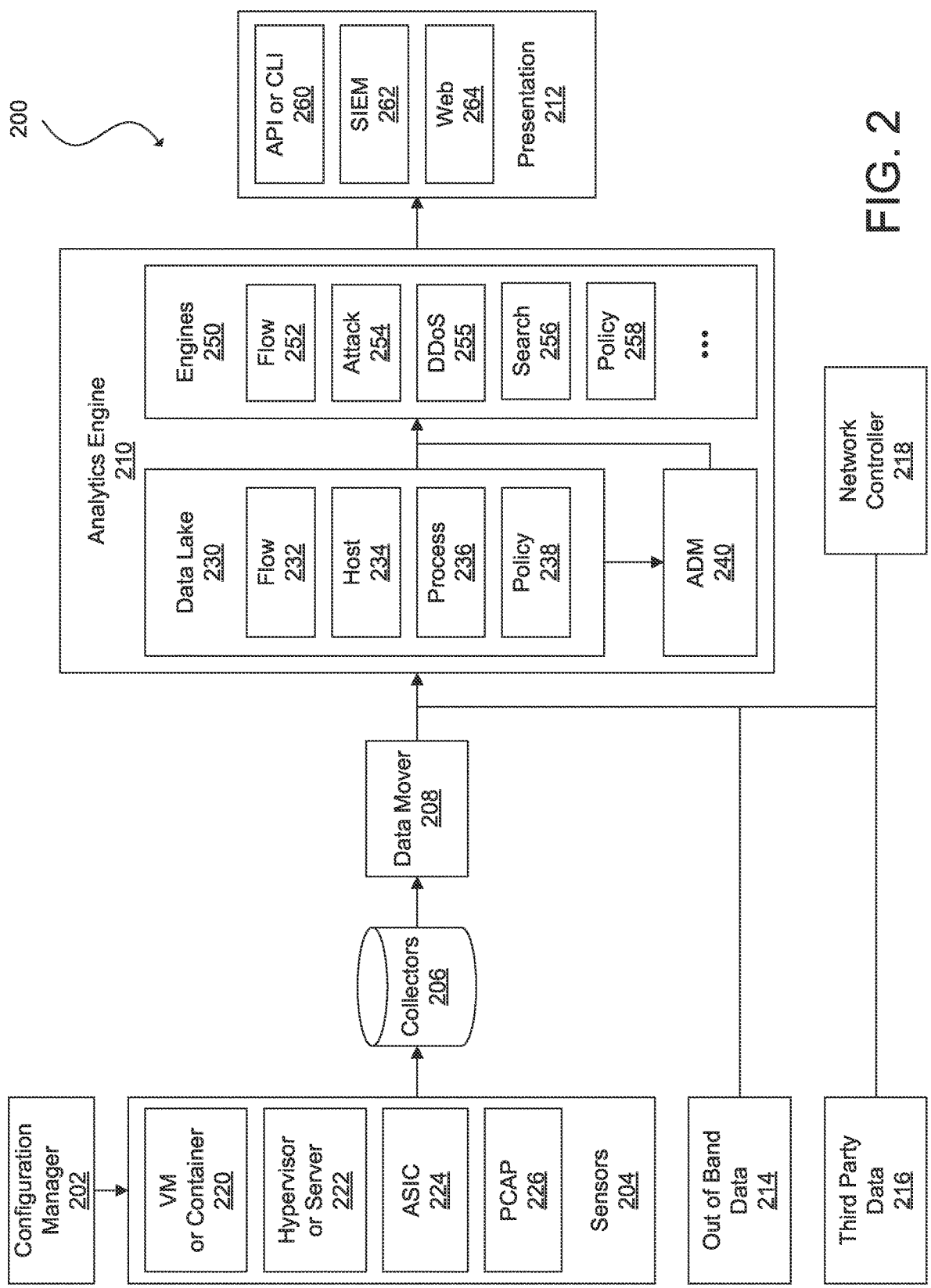
FIG. 2 illustrates an example of a network traffic monitoring system in accordance with an embodiment.

FIG. 2 is an illustration of a network traffic monitoring system 200 in accordance with an embodiment. In some embodiments, the network traffic monitoring system 200 can be used to implement a policy management model, such as the policy management model 100 of FIG. 1, and to determine an optimal clustering based on MDL. The network traffic monitoring system 200 can include a configuration manager 202, sensors 204, a collector module 206, a data mover module 208, an analytics engine 210, and a presentation module 212. In FIG. 2, the analytics engine 210 is also shown in communication with out-of-band data sources 214, third party data sources 216, and a network controller 218.

The configuration manager 202 can be used to provision and maintain the sensors 204, including installing sensor software or firmware in various nodes of a network, configuring the sensors 204, updating the sensor software or firmware, among other sensor management tasks. For example, the sensors 204 can be implemented as virtual partition images (e.g., virtual machine (VM) images or container images), and the configuration manager 202 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 202 can instantiate a new virtual partition or migrate an existing partition to a different physical server. The configuration manager 202 can also be used to configure the new or migrated sensor.

The configuration manager 202 can also monitor the health of the sensors 204. For example, the configuration manager 202 may request for status updates and/or receive heartbeat messages, initiate performance tests, generate health checks, and perform other health monitoring tasks. In some embodiments, the configuration manager 202 can also authenticate the sensors 204. For instance, the sensors 204 can be assigned a unique identifier, such as by using a one-way hash function of a sensor's basic input/out system (BIOS) universally unique identifier (UUID) and a secret key stored by the configuration image manager 202. The UUID can be a large number that may be difficult for a malicious sensor or other device or component to guess. In some embodiments, the configuration manager 202 can keep the sensors 204 up to date by installing the latest versions of sensor software and/or applying patches. The configuration manager 202 can obtain these updates automatically from a local source or the Internet.

The sensors 204 can reside on various nodes of a network, such as a virtual partition (e.g., VM or container) 220; a hypervisor or shared kernel managing one or more virtual partitions and/or physical servers 222, an application-specific integrated circuit (ASIC) 224 of a switch, router, gateway, or other networking device, or a packet capture (pcap) 226 appliance (e.g., a standalone packet monitor, a device connected to a network devices monitoring port, a device connected in series along a main trunk of a datacenter, or similar device), or other element of a network. The sensors 204 can monitor network traffic between nodes, and send network traffic data and corresponding data (e.g., host data, process data, user data, etc.) to the collectors 208 for storage. For example, the sensors 204 can sniff packets being sent over its hosts' physical or virtual network interface card (NIC) and/or individual processes can be configured to report network traffic and corresponding data to the sensors 204. Incorporating the sensors 204 on multiple nodes and within multiple partitions of some nodes of the network can provide for robust capture of network traffic and corresponding data. In some embodiments, each node of the network (e.g., VM, container, or other virtual partition 220, hypervisor, shared kernel, or physical server 222, ASIC 224, pcap 226, etc.) includes a respective sensor 204. However, it should be understood that various software and hardware configurations can be used to implement the sensor network 204.

As the sensors 204 capture communications and corresponding data, they may continuously send network traffic and corresponding data to the collectors 208. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 204 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 204 can perform some preprocessing of the network traffic and corresponding data before sending the data to the collectors 208. For example, the sensors 204 can remove extraneous or duplicative data or they can create summaries of the data (e.g., latency, number of packets per flow, number of bytes per flow, number of flows, etc.). In some embodiments, the sensors 204 can be configured to only capture certain types of information and disregard the rest. In some embodiments, the sensors 204 can be configured to capture only a representative sample of packets (e.g., every 1,000th packet or other suitable sample rate) and corresponding data.

Since the sensors 204 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 210. Further, collecting network traffic and corresponding data from multiple points of view ensures more accurate data is captured. For example, a conventional sensor network may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by the conventional sensor network. The sensor network 204 of various embodiments substantially mitigates or eliminates these issues altogether by locating sensors at multiple points of potential failure. Moreover, the network traffic monitoring system 200 can verify multiple instances of data for a flow (e.g., source endpoint flow data, network device flow data, and endpoint flow data) against one another.

In some embodiments, the network traffic monitoring system 200 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 200 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 200 can assemble data for the flow from the first packet captured by the first sensor and the second packet captured by the second sensor.

As discussed, the sensors 204 can send network traffic and corresponding data to the collectors 206. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 204 are not assigned specific collectors but the network traffic monitoring system 200 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send network traffic and corresponding data related to one type of process to one collector and network traffic and corresponding data related to another type of process to another collector.

The collectors 206 can be any type of storage medium that can serve as a repository for the network traffic and corresponding data captured by the sensors 204. In some embodiments, data storage for the collectors 206 is located in an in-memory database, such as dashDB from IBM®, although it should be appreciated that the data storage for the collectors 206 can be any software and/or hardware capable of providing rapid random access speeds typically used for analytics software. In various embodiments, the collectors 206 can utilize solid state drives, disk drives, magnetic tape drives, or a combination of the foregoing according to cost, responsiveness, and size requirements. Further, the collectors 206 can utilize various database structures such as a normalized relational database or a NoSQL database, among others.

In some embodiments, the collectors 206 may only serve as network storage for the network traffic monitoring system 200. In such embodiments, the network traffic monitoring system 200 can include a data mover module 208 for retrieving data from the collectors 206 and making the data available to network clients, such as the components of the analytics engine 210. In effect, the data mover module 208 can serve as a gateway for presenting network-attached storage to the network clients. In other embodiments, the collectors 206 can perform additional functions, such as organizing, summarizing, and preprocessing data. For example, the collectors 206 can tabulate how often packets of certain sizes or types are transmitted from different nodes of the network. The collectors 206 can also characterize the traffic flows going to and from various nodes. In some embodiments, the collectors 206 can match packets based on sequence numbers, thus identifying traffic flows and connection links. As it may be inefficient to retain all data indefinitely in certain circumstances, in some embodiments, the collectors 206 can periodically replace detailed network traffic and corresponding data with consolidated summaries. In this manner, the collectors 206 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 210 may be provided with examples of network states corresponding to an attack and network states corresponding to normal operation. The analytics engine 210 can then analyze network traffic and corresponding data to recognize when the network is under attack. In some embodiments, the network may operate within a trusted environment for a period of time so that the analytics engine 210 can establish a baseline of normal operation. Since malware is constantly evolving and changing, machine learning may be used to dynamically update models for identifying malicious traffic patterns.

In some embodiments, the analytics engine 210 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 210 can include a data lake 230, an application dependency mapping (ADM) module 240, and elastic processing engines 250. The data lake 230 is a large-scale storage repository that provides massive storage for various types of data, enormous processing power, and the ability to handle nearly limitless concurrent tasks or jobs. In some embodiments, the data lake 230 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 208 receives raw network traffic and corresponding data from the collectors 206 and distributes or pushes the data to the data lake 230. The data lake 230 can also receive and store out-of-band data 214, such as statuses on power levels, network availability, server performance, temperature conditions, cage door positions, and other data from internal sources, and third party data 216, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 230 may instead fetch or pull raw traffic and corresponding data from the collectors 206 and relevant data from the out-of-band data sources 214 and the third party data sources 216. In yet other embodiments, the functionality of the collectors 206, the data mover 208, the out-of-band data sources 214, the third party data sources 216, and the data lake 230 can be combined. Various combinations and configurations are possible as would be known to one of ordinary skill in the art.

Each component of the data lake 230 can perform certain processing of the raw network traffic data and/or other data (e.g., host data, process data, user data, out-of-band data, third party data, etc.) to transform the raw data to a form useable by the elastic processing engines 250. In some embodiments, the data lake 230 can include repositories for flow attributes 232, host and/or endpoint attributes 234, process attributes 236, and policy attributes 238. In some embodiments, the data lake 230 can also include repositories for VM or container attributes, application attributes, tenant attributes, network topology, application dependency maps, cluster attributes, etc.

The flow attributes 232 relate to information about flows traversing the network. A flow is generally one or more packets sharing certain attributes that are sent within a network within a specified period of time. The flow attributes 232 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 232 can also include aggregate packet data such as flow start time, flow end time, number of packets for a flow, number of bytes for a flow, the union of TCP flags for a flow, among other flow data.

The host and/or endpoint attributes 234 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 234 can also include the out-of-band data 214 regarding hosts such as power level, temperature, and physical location (e.g., room, row, rack, cage door position, etc.) or the third party data 216 such as whether a host and/or endpoint is on an IP watch list or otherwise associated with a security threat, Whois data, or geocoordinates. In some embodiments, the out-of-band data 214 and the third party data 216 may be associated by process, user, flow, or other more granular or less granular network element or network communication.

The process attributes 236 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 238 contain information relating to network policies. As discussed, policies can dictate whether a particular flow is allowed or denied by the network as well as a specific route by which a packet traverses the network. For example, policies can be used to mark packets so that certain kinds of traffic receive differentiated service when used in combination with queuing techniques such as those based on priority, fairness, weighted fairness, token bucket, random early detection, round robin, among others. The policy attributes 238 can include policy statistics such as a number of times a policy was enforced or a number of times a policy was not enforced. The policy attributes 238 can also include associations with network traffic data. For example, flows found to be non-conformant can be linked or tagged with corresponding policies to assist in the investigation of non-conformance.

The analytics engine 210 may include any number of engines 250, including for example, a flow engine 252 for identifying flows (e.g., flow engine 252) or an attacks engine 254 for identify attacks to the network. In some embodiments, the analytics engine can include a separate distributed denial of service (DDoS) attack engine 255 for specifically detecting DDoS attacks. In other embodiments, a DDoS attack engine may be a component or a sub-engine of a general attacks engine. In some embodiments, the attacks engine 254 and/or the DDoS engine 255 can use machine learning techniques to identify security threats to a network. For example, the attacks engine 254 and/or the DDoS engine 255 can be provided with examples of network states corresponding to an attack and network states corresponding to normal operation. The attacks engine 254 and/or the DDoS engine 255 can then analyze network traffic data to recognize when the network is under attack. In some embodiments, the network can operate within a trusted environment for a time to establish a baseline for normal network operation for the attacks engine 254 and/or the DDoS.

The analytics engine 210 may further include a search engine 256. The search engine 256 may be configured, for example to perform a structured search, an NLP (Natural Language Processing) search, or a visual search. Data may be provided to the engines from one or more processing components.

The analytics engine 210 can also include a policy engine 258 that manages network policy, including creating and/or importing policies, monitoring policy conformance and non-conformance, enforcing policy, simulating changes to policy or network elements affecting policy, among other policy-related tasks.

The ADM module 240 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 240 can receive input data from various repositories of the data lake 230 (e.g., the flow attributes 232, the host and/or endpoint attributes 234, the process attributes 236, etc.). The ADM module 240 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 240 may define an ADM for the web application as a three-tier application including a first EPG comprising the first endpoints, a second EPG comprising the second endpoints, and a third EPG comprising the third endpoints.

The presentation module 216 can include an application programming interface (API) or command line interface (CLI) 260, a security information and event management (STEM) interface 262, and a web front-end 264. As the analytics engine 210 processes network traffic and corresponding data and generates analytics data, the analytics data may not be in a human-readable form or it may be too voluminous for a user to navigate. The presentation module 216 can take the analytics data generated by analytics engine 210 and further summarize, filter, and organize the analytics data as well as create intuitive presentations for the analytics data.

In some embodiments, the API or CLI 260 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 262 can be implemented using Hadoop® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 208 as input, and output messages to a SIEM platform, such as Splunk®. The Splunk® platform is utilized for searching, monitoring, and analyzing machine-generated data.

In some embodiments, the web front-end 264 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 2 illustrates an example configuration of the various components of a network traffic monitoring system, those of skill in the art will understand that the components of the network traffic monitoring system 200 or any system described herein can be configured in a number of different ways and can include any other type and number of components. For example, the sensors 204, the collectors 206, the data mover 208, and the data lake 230 can belong to one hardware and/or software module or multiple separate modules. Other modules can also be combined into fewer components and/or further divided into more components.

Figure 3:
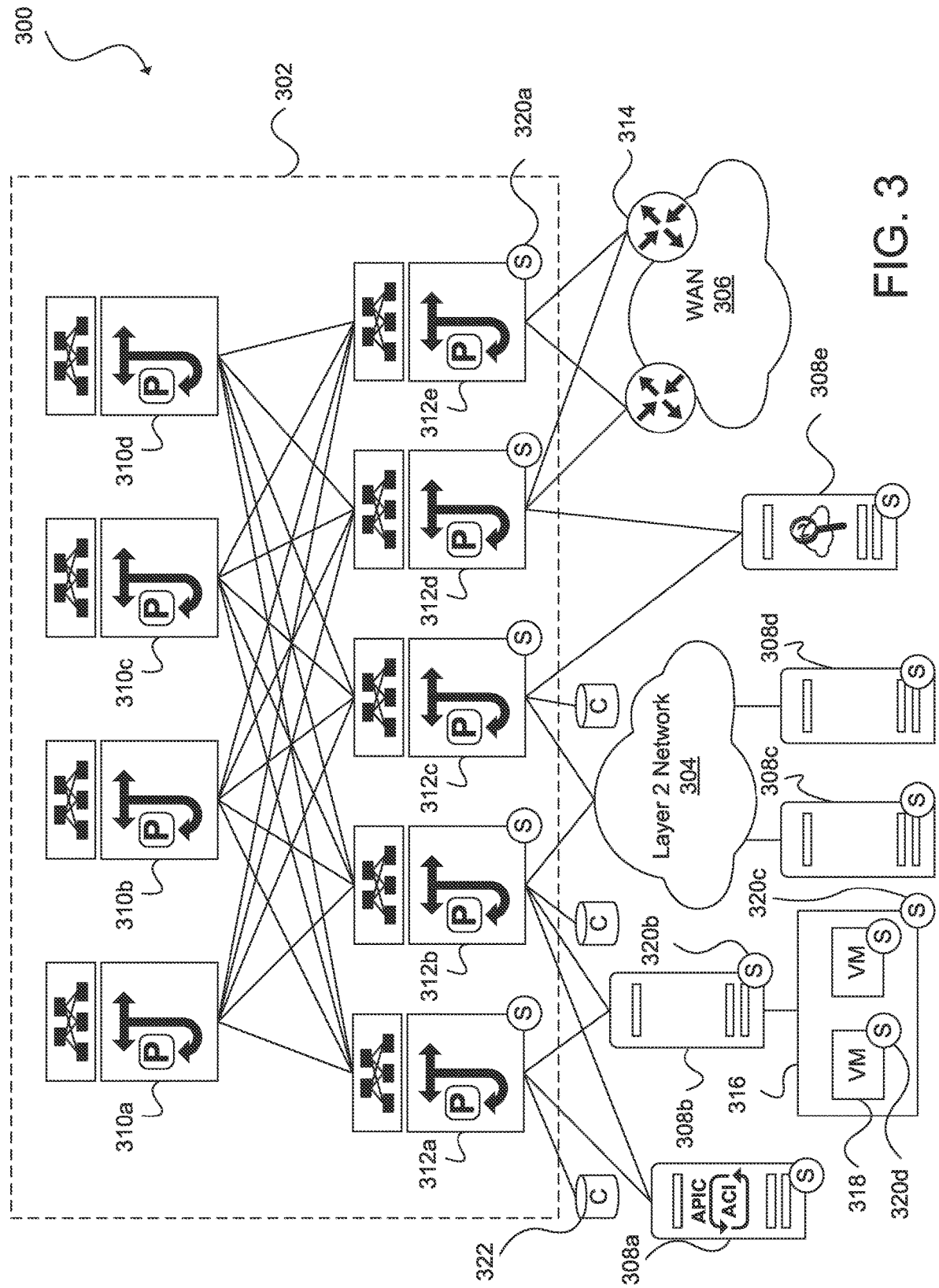
FIG. 3 illustrates an example of a network environment in accordance with an embodiment.

FIG. 3 illustrates an example of a network environment 300 in accordance with an embodiment. In some embodiments, a network traffic monitoring system, such as the network traffic monitoring system 200 of FIG. 2, can be implemented in the network environment 300. It should be understood that, for the network environment 300 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 300 can include any number or type of resources, which can be accessed and utilized by clients or tenants. The illustrations and examples provided herein are for clarity and simplicity.

The network environment 300 can include a network fabric 302, a Layer 2 (L2) network 304, a Layer 3 (L3) network 306, and servers 308a, 308b, 308c, 308d, and 308e (collectively, 308). The network fabric 302 can include spine switches 310a, 310b, 310c, and 310d (collectively, "310") and leaf switches 312a, 312b, 312c, 312d, and 312e (collectively, "312"). The spine switches 310 can connect to the leaf switches 312 in the network fabric 302. The leaf switches 312 can include access ports (or non-fabric ports) and fabric ports. The fabric ports can provide uplinks to the spine switches 310, while the access ports can provide connectivity to endpoints (e.g., the servers 308), internal networks (e.g., the L2 network 304), or external networks (e.g., the L3 network 306).

The leaf switches 312 can reside at the edge of the network fabric 302, and can thus represent the physical network edge. For instance, in some embodiments, the leaf switches 312d and 312e operate as border leaf switches in communication with edge devices 314 located in the external network 306. The border leaf switches 312d and 312e may be used to connect any type of external network device, service (e.g., firewall, deep packet inspector, traffic monitor, load balancer, etc.), or network (e.g., the L3 network 306) to the fabric 302.

Although the network fabric 302 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 312 can be top-of-rack switches configured according to a top-of-rack architecture. In other embodiments, the leaf switches 312 can be aggregation switches in any particular topology, such as end-of-row or middle-of-row topologies. In some embodiments, the leaf switches 312 can also be implemented using aggregation switches.

Moreover, the topology illustrated in FIG. 3 and described herein is readily scalable and may accommodate a large number of components, as well as more complicated arrangements and configurations. For example, the network may include any number of fabrics 302, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 302 can flow through the leaf switches 312. In some embodiments, the leaf switches 312 can provide endpoints (e.g., the servers 308), internal networks (e.g., the L2 network 304), or external networks (e.g., the L3 network 306) access to the network fabric 302, and can connect the leaf switches 312 to each other. In some embodiments, the leaf switches 312 can connect endpoint groups (EPGs) to the network fabric 302, internal networks (e.g., the L2 network 304), and/or any external networks (e.g., the L3 network 306). EPGs are groupings of applications, or application components, and tiers for implementing forwarding and policy logic. EPGs can allow for separation of network policy, security, and forwarding from addressing by using logical application boundaries. EPGs can be used in the network environment 300 for mapping applications in the network. For example, EPGs can comprise a grouping of endpoints in the network indicating connectivity and policy for applications.

As discussed, the servers 308 can connect to the network fabric 302 via the leaf switches 312. For example, the servers 308a and 308b can connect directly to the leaf switches 312a and 312b, which can connect the servers 308a and 308b to the network fabric 302 and/or any of the other leaf switches. The servers 308c and 308d can connect to the leaf switches 312b and 312c via the L2 network 304. The servers 308c and 308d and the L2 network 304 make up a local area network (LAN). LANs can connect nodes over dedicated private communications links located in the same general physical location, such as a building or campus.

The WAN 306 can connect to the leaf switches 312d or 312e via the L3 network 306. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 308 can include any communication device or component, such as a computer, server, blade, hypervisor, virtual machine, container, process (e.g., running on a virtual machine), switch, router, gateway, host, device, external network, etc.

In some embodiments, the network environment 300 also includes a network controller running on the host 308a. The network controller is implemented using the Application Policy Infrastructure Controller (APIC™) from Cisco®. The APIC™ provides a centralized point of automation and management, policy programming, application deployment, and health monitoring for the fabric 302. In some embodiments, the APIC™ is operated as a replicated synchronized clustered controller. In other embodiments, other configurations or software-defined networking (SDN) platforms can be utilized for managing the fabric 302.

In some embodiments, a physical server 308 may have instantiated thereon a hypervisor 316 for creating and running one or more virtual switches (not shown) and one or more virtual machines 318, as shown for the host 308b. In other embodiments, physical servers may run a shared kernel for hosting containers. In yet other embodiments, the physical server 308 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 308a, 308c, 308d, and 308e.

The network environment 300 can also integrate a network traffic monitoring system, such as the network traffic monitoring system 200 shown in FIG. 2. For example, the network traffic monitoring system of FIG. 3 includes sensors 320a, 320b, 320c, and 320d (collectively, "320"), collectors 322, and an analytics engine, such as the analytics engine 210 of FIG. 2, executing on the server 308e. The analytics engine 308e can receive and process network traffic data collected by the collectors 322 and detected by the sensors 320 placed on nodes located throughout the network environment 300. Although the analytics engine 308e is shown to be a standalone network appliance in FIG. 3, it will be appreciated that the analytics engine 308e can also be implemented as a virtual partition (e.g., VM or container) that can be distributed onto a host or cluster of hosts, software as a service (SaaS), or other suitable method of distribution. In some embodiments, the sensors 320 run on the leaf switches 312 (e.g., the sensor 320a), the hosts 308 (e.g., the sensor 320b), the hypervisor 316 (e.g., the sensor 320c), and the VMs 318 (e.g., the sensor 320d). In other embodiments, the sensors 320 can also run on the spine switches 310, virtual switches, service appliances (e.g., firewall, deep packet inspector, traffic monitor, load balancer, etc.) and in between network elements. In some embodiments, sensors 320 can be located at each (or nearly every) network component to capture granular packet statistics and data at each hop of data transmission. In other embodiments, the sensors 320 may not be installed in all components or portions of the network (e.g., shared hosting environment in which customers have exclusive control of some virtual machines).

As shown in FIG. 3, a host may include multiple sensors 320 running on the host (e.g., the host sensor 320b) and various components of the host (e.g., the hypervisor sensor 320c and the VM sensor 320d) so that all (or substantially all) packets traversing the network environment 300 may be monitored. For example, if one of the VMs 318 running on the host 308b receives a first packet from the WAN 306, the first packet may pass through the border leaf switch 312d, the spine switch 310b, the leaf switch 312b, the host 308b, the hypervisor 316, and the VM. Since all or nearly all of these components contain a respective sensor, the first packet will likely be identified and reported to one of the collectors 322. As another example, if a second packet is transmitted from one of the VMs 318 running on the host 308b to the host 308d, sensors installed along the data path, such as at the VM 318, the hypervisor 316, the host 308b, the leaf switch 312b, and the host 308d will likely result in capture of metadata from the second packet.

Figure 4:
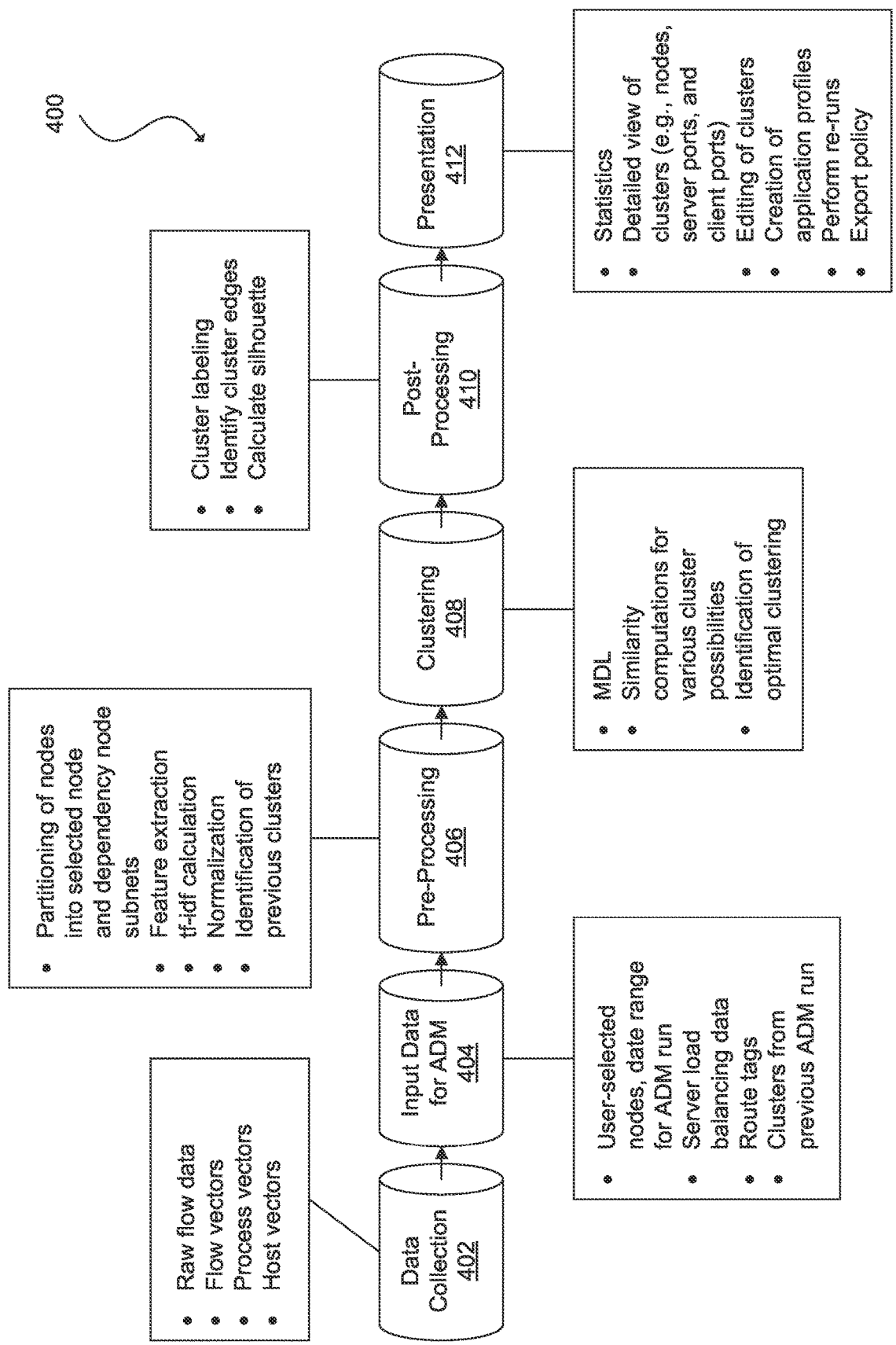
FIG. 4 illustrates an example of a data pipeline for determining clusters for application dependency mapping in accordance with an embodiment.

FIG. 4 illustrates an example of a data pipeline 400 for determining clusters in an application dependency map in accordance with an example embodiment. In some embodiments, the data pipeline 400 can be directed by a network traffic monitoring system, such as the network traffic monitoring system 200 of FIG. 2; an analytics engine, such as the analytics engine 210 of FIG. 2; an application dependency mapping module, such as the ADM module 240 of FIG. 2; or other network service or network appliance. The data pipeline 400 includes a data collection stage 402 in which network traffic data and corresponding data (e.g., host data, process data, user data, etc.) are captured by sensors (e.g., the sensors 204 of FIG. 2) located throughout the network. As discussed, the data can be captured from multiple perspectives to provide a comprehensive view of the network. The data collected may also include other types of information, such as tenant information, virtual partition information, out-of-band information, third party information, and other relevant information. In some embodiments, the flow data and associated data can be aggregated and summarized daily or according to another suitable increment of time, and flow vectors, process vectors, host vectors, and other feature vectors can be calculated during the data collection stage 402. This can substantially reduce processing during an ADM run.

The data pipeline 400 also includes an ADM input data stage 404 in which a network or security administrator or other authorized user may configure an ADM run by selecting the date range of the flow data and associated data to analyze, and those nodes for which the administrator wants application dependency maps and/or cluster information. In some embodiments, the administrator can also input side information, such as server load balance, route tags, and previously identified clusters during the ADM input data stage 404. In other embodiments, the side information can be automatically pulled or another network element can push the side information for the ADM run.

The next stage of the data pipeline 400 is pre-processing 406. During the pre-processing stage 406, nodes of the network are partitioned into selected node and dependency node subnets. Selected nodes are those nodes for which the user requests application dependency maps and cluster information. Dependency nodes are those nodes that are not explicitly selected by the users for an ADM run but are nodes that communicate with the selected nodes. To obtain the partitioning information, edges of an application dependency map (i.e., flow data) and unprocessed feature vectors can be analyzed.

Other tasks can also be performed during the pre-processing stage 406, including identifying dependencies of the selected nodes and the dependency nodes; replacing the dependency nodes with tags based on the dependency nodes' subnet names; extracting feature vectors for the selected nodes, such as by aggregating daily vectors across multiple days, calculating term frequency-inverse document frequency (tf-idf), and normalizing the vectors (e.g., $l_2$ normalization); and identifying existing clusters.

After pre-processing, the data pipeline 400 may proceed to a clustering stage 408. In the clustering stage 408, various machine learning techniques can be implemented to analyze feature vectors within a single domain or across different domains to determine the optimal clustering given a set of input nodes. Machine learning is an area of computer science in which the goal is to develop models using example observations (i.e., training data), that can be used to make predictions on new observations. The models or logic are not based on theory but are empirically based or data-driven.

Machine learning can be categorized as supervised or unsupervised. In supervised learning, the training data examples contain labels for the outcome variable of interest. There are example inputs and the values of the outcome variable of interest are known in the training data. The goal of supervised learning is to learn a method for mapping inputs to the outcome of interest. The supervised models then make predictions about the values of the outcome variable for new observations. Supervised learning methods include boosting, neural networks, and random forests, among others.

Boosting is a machine learning algorithm which finds a highly accurate hypothesis (e.g., low error rate) from a combination of many "weak" hypotheses (e.g., substantial error rate). Given a data set comprising examples within a class and not within the class and weights based on the difficulty of classifying an example and a weak set of classifiers, boosting generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified).

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the auto associative neural network, the probabilistic decision-based neural network (PDBNN), and the sparse network of winnows (SNOW).

A random forest is a machine learning algorithm that relies on a combination of decision trees in which each tree depends on the values of a random vector sampled independently and with the same distribution for all trees in the forest. A random forest can be trained for some number of trees 'T' by sampling 'N' cases of the training data at random with replacement to create a subset of the training data. At each node, a number 'm' of the features are selected at random from the set of all features. The feature that provides the best split is used to do a binary split on that node. At the next node, another number 'm' of the features are selected at random and the process is repeated.

In unsupervised learning, there are example inputs, however, no outcome values. The goal of unsupervised learning can be to find patterns in the data or predict a desired outcome. Unsupervised learning methods include principle component analysis (PCA), expectation-maximization (EM), and clustering, among others.

PCA is a machine learning algorithm that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance (i.e., the principal component accounts for as much of the variability in the data as possible), and each succeeding component in turn has the highest variance possible under the constraint that it is orthogonal to the preceding components. The resulting vectors are an uncorrelated orthogonal basis set.

Clustering is a process that groups a set of objects into the same group (i.e., cluster) when the objects are more similar, less distant, denser, or otherwise share more attributes with respect to each other than to those in other groups. An example of clustering is the k-means algorithm in which a number of n nodes are partitioned into k clusters such that each node belongs to the cluster with the nearest mean. The algorithm proceeds by alternating steps, assignment and update. During assignment, each node is assigned to a cluster whose mean yields the least within-cluster sum of squares (WCSS) (i.e., the nearest mean). During update, the new means is calculated to be the centroids of the nodes in the new clusters. Convergence is achieved when the assignments no longer change. In some embodiments, k can be determined based on MDL as discussed elsewhere herein.

The k-means algorithm is an example of partition clustering. Other approaches for clustering include hierarchical clustering (e.g., agglomerative and divisive methods), density-based clustering (e.g., EM or DBSCAN), model-based clustering (e.g., decision trees or neural networks), grid-based clustering (e.g., fuzzy or evolutionary methods), among other categories.

EM is an iterative process for finding the maximum likelihood or maximum a posteriori estimates of parameters in a statistical model, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found during the E step. These parameter-estimates are then used to determine the distribution of the latent variables in the next E step.

In some embodiments, the clustering stage 408 can include a determination of the optimal number of clusters using the minimum description length (MDL) principle. As discussed, the MDL principle is that the best model or hypothesis for a given set of data is the one that leads to best compression of the data (i.e., minimizes the total length of the hypothesis plus the description of the exceptions to the hypothesis). MDL can be attractive to implement because MDL balances how well the model or theory fits with respect to observations and the complexity or richness of the model or theory, MDL techniques automatically and inherently avoid overfitting and can be used to determine both the parameters and the number of parameters of the model or theory, MDL processes do not require a ground truth model, and MDL methods provide good predictive performance on unobserved data.

In some embodiments, a suitable network component (e.g., network traffic monitoring system, analytics engine, ADM module, etc.), or generally, a network, may implement instructions, which can be similar to the example pseudo code recited in Table 1, for determining the optimal number of clusters. It should be understood that, for any process discussed herein, there can be additional, fewer, or alternative steps performed in similar or alternative orders, or in parallel, within the scope of the various embodiments unless otherwise stated. To begin, the network can generate a graph using network traffic and corresponding data collected during a specified period of time. Nodes of the graph can include source endpoints (i.e., clients), destination endpoints (i.e., servers), and destination ports (i.e., server ports). Edges of the graph may correspond to observed traffic from the source endpoints to the destination endpoints at the destination ports. In some embodiments, the edges of the graph can be associated with values or weights reflecting an absolute number of flows or a relative number of flows of the edge relative to other edges. For purposes of simplicity and clarity, the graph representation of flow data is limited to the source network address, destination network address, and destination port in this example. However, it should be appreciated that other embodiments may additionally or alternatively use other nodes based on other features or attributes of the network domain (e.g., source port, number of packets for a flow, number of bytes for a flow, etc.) and/or features or attributes of the process domain (e.g., process name, parent process, process owner, etc.) and/or features or attributes of other domains (e.g., host domain, virtual partition domain, user domain, etc.).

To determine the optimal number of clusters 'k' for the network, the network can evaluate an MDL score for each potential value of 'k,' where 'k' can be between 1 (i.e., all of the nodes of the network form a single cluster) and the number of nodes in the graph 'n' (i.e., each node forms its own cluster). The MDL score for a particular clustering can be the based on description lengths of observed flows. In this example, the MDL score is the sum of the description lengths for each source cluster—destination cluster—destination port combinations for a particular clustering. As discussed, in other embodiments, the description lengths can be represented additionally or alternatively by other nodes corresponding to other features and attributes of the same domain (i.e., network domain) and/or features of other domains (e.g., process domain, host domain, virtual partition domain, user domain, etc.). In other embodiments, the MDL score can also represent edges as various empirical values or weights. For example, in an embodiment, an MDL score can factor in the absolute number of flows or the relative number of flows of an edge such as by associating the each edge with particular values or weights depending on the number of flows observed for each edge.

In this example, the description length is a function of the minimum between observed graph edges and unobserved graph edges+1, where observed graph edges can be calculated as the product of the number of unique source nodes and destination nodes and unobserved graph edges can be a difference of the number of observed edges and the product of the number of nodes in each source cluster and the number of nodes in each destination cluster. In this example, a better clustering corresponds to a lower MDL score. Thus, the optimal number of clusters 'k' is the clustering with the minimum MDL score.

In other embodiments, the description length and the interpretation of the MDL scores depend on the features selected for representing a flow, the domains selected for representing a flow, how feature values are represented, and how the features are combined within a domain and across domains, among numerous other factors. The appropriate description length and MDL score interpretation will be apparent to those of ordinary skill in the art when practicing the various embodiments.

TABLE 1

Example pseudo code for determining optimal number of clusters in accordance with an embodiment 1: initialize G // G is graph with client nodes, server nodes, and server ports nodes and edges from client nodes to server nodes to server port nodes if data flow is observed for that combination, initialize G by generating the graph
2: initialize k // k is optimum number of clusters for a network, initialize k by setting default value for k (e.g., number of nodes n/3 in the graph G)
3: initialize $s_c$ // $s_c$ is MDL score for current optimal clustering, initialize $s_c$ by setting default value for $s_c$ (e.g., MDL score for max number of clusters, i.e., number of nodes n in the graph G)
4: for (i = 1; i < n − 1; i++)
5:    initialize $s_i$ = 0 // $s_i$ is the MDL score for a clustering $c_i$
6:    for each src cluster-dest cluster-port combination in cluster $c_i$
7:       set m = number of observed edges, where an edge is a flow from src node (i.e., client) to dest node (i.e., server) at dest node port (i.e., server port)
8:       set n = the number of unobserved edges
9:       compute d = min(m, 1 + n) // d is the description length for a src cluster-dest cluster-port combination
10:      $s_i$ += d // MDL score for clustering $c_i$ is sum of descriptions lengths across all src cluster-dest cluster-port combinations
11:    if ($s_i$ < $s_c$)

TABLE 1-continued

Figure 5:
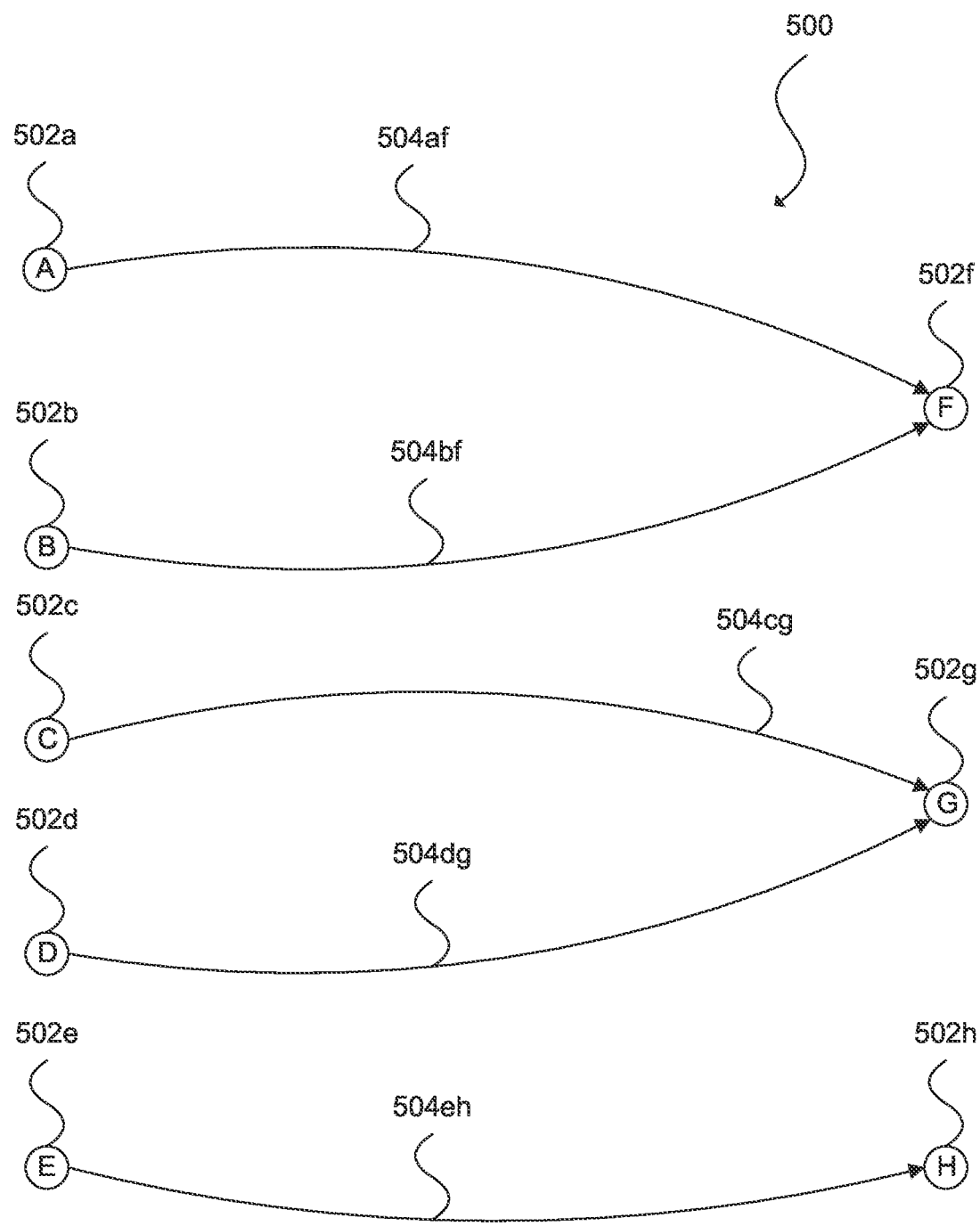
FIG. 5 illustrates an example of a graph for determining clusters for application dependency mapping in accordance with an embodiment.

Example pseudo code for determining optimal number
of clusters in accordance with an embodiment 12:    $s_c = s_i$
13:    k = i // optimal number of clusters is minimum MDL score FIG. 5 illustrates an example of a graph 500 that can be used to calculate an MDL score for a particular clustering in accordance with an embodiment. It will be appreciated that the graph 500 is only provided herein for purposes of explaining how to compute the MDL score computed from the graph 500 but a graph corresponding to the traffic flow of an actual network would unlikely be limited to the number of nodes and edges of the graph 500. For example, the number of nodes and edges of a small enterprise network may be in the hundreds or thousands or much greater if, for instance, the network provides support for the Internet of Things (IoT) applications. Further, most if not all the edges of such a graph are likely to be bidirectional due to the handshaking that most network protocols require.

The graph 500 includes nodes 502a, 502b, . . . 502h (collectively, "502"). Each node can represent an endpoint (e.g., physical object capable of network communication, virtual partition, network device, etc.), an EPG (e.g., subnet, network, or other collection of endpoints), or a combination thereof depending on the specified granularity of the application dependency map. The nodes 502 can be connected to each other via edges 504af, 504ag, . . . , 504nn (collectively, "504"). Each edge can represent a unidirectional flow between a source node and a destination node, a bidirectional flow, a direct physical link, or a virtual link. In some embodiments, each edge may also be associated with network statistics related to its flow(s), such as the total number of packets, the total number of bytes, and/or total number of flows, among other statistics. As discussed, these network statistics can be used to weight each edge for determining the MDL score of a particular clustering. In this example, the edges 504 represent unidirectional flows that travel in the direction indicated by the arrows.

The possible range of the number clusters of the graph 500 is from 1, wherein all of the nodes form a single cluster, to 8, the total number of nodes 'n' in the graph, wherein each node forms a separate cluster. However, the range of the number of clusters for most networks will fall within a smaller range between the maximum. In an embodiment, the initial value for determining the optimal number of clusters 'k' for the graph 500 can be set to 'n/3' or the total number of nodes of the graph divided by three. As would be understood by one of ordinary skill, the more that is known about a network, the more the range of the possible number of clusters 'k' can be limited to reduce the amount of time and processing needed by eliminating possible values for 'k' that are not applicable for the network. For example, if the network is known to have a number of three-tier applications 'a,' then the lower bound for the possible number of clusters 'k' can be set to '3×a' because there are at least '3×a' different clusters for each tier of the number of applications 'a' and the upper bound for the possible number of clusters 'k' can be set to 'n−a' because there can be no more than 'n−a' clusters in the network.

To calculate the optimal number of clusters 'k' for the graph 500, the initial value T can be set to a particular value, such as 1 or other suitable default value. For purposes of conciseness, i' is set to 4. Although the MDL score for each possible clustering for 'i=4' would be computed to determine the minimum MDL score for 'i=4,' for brevity, the clustering of {A, B, C, D, E}; {F}; {G}; and {H} can be selected. With this configuration, traffic corresponds to the following patterns: {A, B, C, D, E} to {F}; {A, B, C, D, E} to {G}; and {A, B, C, D, E} to {H}.

For {A, B, C, D, E} to {F}, the graph 500 includes 2 observed edges, 504af and 504bf, and three unobserved edges, 504cf, 504df, and 504ef. The description length for this traffic pattern is the minimum of the observed edges and unobserved edges+1, i.e., min(2,3+1) or 2.

For {A, B, C, D, E} to {G}, the graph 500 includes 2 observed edges, 504cg and 504dg, and three unobserved edges, 504ag, 504bg, and 504eg, and the description length for this traffic pattern is min(2,3+1) or 2.

For {A, B, C, D, E} to {H}, the graph 500 includes 1 observed edge, 504eh, and 4 unobserved edges, 504ah, 504bh, 504ch, 504dh. The description length for this pattern is min(1,4+1) or 1.

The MDL score for this particular clustering of 'i=4,' is the sum of the description lengths, i.e., 2+2+1 or 5. If this clustering is the lowest MDL score, then the optimal number of clusters 'k' is 4. This process is repeated for each value of T until the number of clusters 'n' in the graph 500 or other suitable maximum number selected based on predetermined information known about the network. However, for purposes of simplicity and conciseness, the next value of T can be set to 6 for the clusters {A, B}; {C, D}; {E}; {F}; {G}; and {H}. With this clustering, the possible permutations for traffic can include the following patterns: {A, B} to {F}, {C, D} to {G}, and {E} to {H}; {A, B} to {F}, {C, D} to {H}, and {E} to {G}; {A, B} to {G}, {C, D} to {F}, and {E} to {H}; {A, B} to {G}, {C, D} to {H}, and {E} to {F}; {A,B} to {H}, {C, D} to {F}, and {E} to {G}; {A, B} to {H}, {C, D} to {G}, and {E} to {F}.

For the first pattern, the graph 500 includes 3 observed edges and 0 unobserved edges such that the description length is min(3,0+1) or 1. For the second, third, and sixth patterns, the number of observed edges is 1 and the number of unobserved edges is 2 such that the description length is min(1,2+1) or 1 for these patterns. For the fourth and fifth, the number of observed edges is 0 and the number of unobserved edges is 3 and the description lengths for these patterns is min(0, 3+1) or 0. The MDL score for this particular clustering of 'i=6' is the sum of the description lengths of 1+1+1+0+0+1 or 4. Thus, this particular clustering of 'i=6' would be selected over the example of the first clustering of 'i=4,' and the optimal number of clusters 'k' would be set to 6, and the process would be repeated for every other possible clustering of 'i=6,' and then for every value of T until the number of nodes in the graph or other maximum.

As discussed, some networks may be made up of several partitions. For example, multiple partitions in a network can arise from routing information or subnet masking. As another example, some public cloud providers may partition their network according to regions zones. Under these circumstances or similar situations, clusters may not span the multiple partitions (i.e., a cluster may not include endpoints that are located in different partitions). Thus, the optimal clustering may vary from one partition to another in networks with multiple partitions. In some embodiments, the MDL principle can be used to improve the number of clusters for each individual partition by using a randomized local search algorithm based upon local searches.

In some embodiments, a multi-partitioned network (or a suitable component of the network) may implement instructions, which can be similar to the example pseudo code recited in Table 2, for determining the optimal number of clusters $k_i$ for each partition $p_i$. The network can begin by selecting a default value '$k_i$' for each partition '$p_i$' in the network. In an embodiment, the default value of '$k_i$' can be the total number of nodes in the network 'n' divided by 3. The MDL score can be computed for the current state (i.e., current $p_i$, current $k_i$), and this step can be repeated for 'n' iterations or until the change in energy 'Δ' is smaller than a delta threshold 't,' wherein the set of partitions 'P' is randomized for each iteration. In this example, the MDL score for a particular partition '$p_i$' and potential optimal number of clusters T can be computed similarly to the approach discussed above with respect to Table 1. In this example, the optimal number of clusters $k_i$ for a particular partition $p_i$ can be based on the highest energy state (e.g., lowest MDL score) evaluated for each $k_i$ for the partition $p_i$. It will be appreciated that appreciated that various embodiments may employ other description length representations and MDL score interpretations depending on selected features, domains, value representations, and combinations, among other factors.

compared to other clusters, which can range from −1 to 1, where a high value indicates that the node is well matched to its own cluster and badly matched to neighboring clusters. If most nodes have a high silhouette score, then the clustering maybe accurate. If many nodes have a low or negative silhouette score, then the clustering may have too many or too few clusters. The silhouette score can be calculated with any similarity or distance metric, such as the Euclidean distance or the Manhattan distance.

The end of the data pipeline 400 is a presentation stage 412 in which clustering data can be meaningfully and intuitively displayed to the user. In some embodiments, a user interface of the presentation stage 412 may allow the user to view statistics on clusters (e.g., number of nodes, edges, clusters, summaries of changes in clustering from the last ADM run, etc.) and detailed information for each cluster (e.g., nodes, server ports, and client ports, etc.). In some embodiments, the user interface may also allow the user to edit clusters (e.g., add or modify names and descriptions of clusters, move nodes from one cluster to another, approve an automatically determined cluster). In some embodiments, the user may operate the user interface to create application profiles, or to perform ADM re-runs.

In some embodiments, a network (or a suitable component of the network) can be utilized to generate policies and simulate enforcement based on one or more application dependency mappings, such as generated using the various embodiments disclosed herein. For example, the network can receive one or more application dependency mappings, and automatically determine policies for the network. The policies can be based on whitelist rules or blacklist rules. As

TABLE 2

Pseudo code for determining optimal number of nodes k
in each partition p in accordance with an embodiment 1: initialize $k_i$ // $k_i$ is optimal number of nodes in partition $p_i$, initialize $k_i$ by selecting default value (e.g., total number of nodes in network n / 3)
2: initialize P // P is set of partitions in network
3: initialize partition p // select default partition (e.g., first(P))
4: initialize energy $E_0$ // $E_0$ is current energy, select default energy (e.g., MDL(p, k) which is the MDL score for partition p for all clusterings based on k)
5: initialize Δ // Δ is change in energy, select default change in energy (e.g., ∞)
6: for (i=k; i ≤ n && Δ > delta threshold t; i++)
7:   set P = random order of partitions in P
8:   while (P not null)
9:     set p = pop(P)
10:     set new energy $E_1$ = MDL(p, i) // compute MDL for current partition p for all clusterings based on i)
11:     set Δ = | $E_1$ − $E_0$ |
12:     if $E_1$ < $E_0$ // new energy $E_1$ is lower than current energy E0, i.e., lower MDL score and better clustering
13:       set $E_0$ = $E_1$
14:       set k = i // pick best k, i.e., highest energy for each partition In some embodiments, the clustering stage 408 can also include a determination of the optimal clustering given the optimal number of clusters determined via MDL theory. For example, network nodes can be evaluated using machine learning to identify an optimal clustering based on similarity amongst the network nodes. After clusters are identified, the data pipeline 400 can include a post-processing stage 410. The post-processing stage 410 can include tasks such as naming or labeling clusters, which may be automatic or user-specified; identifying cluster edges; and validating the clusters, such as by calculating silhouette scores. Silhouette scoring is a method of interpretation and validation of consistency within clusters of data. A silhouette score is a measure of how similar an object is to its own cluster an example of whitelist rule generation, suppose there is an edge of an application dependency mapping between a first endpoint or EPG E1 and a second endpoint or EPG E2. Permissible traffic flows on a set of ports of E1 to one or more ports of E2. A policy can be defined to reflect the permissible traffic from the set of ports of E1 to the one or more ports of E2.

In some embodiments, the network can be used to validate that changes to policy will not result in network misconfiguration and vulnerability to attacks. That is, the network can provide what if analysis, i.e., analyzing what would happen to network traffic upon adding one or more new policies, removing one or more existing policies, or changing membership of one or more EPGs (e.g., adding one or more new endpoints to an EPG, removing one or more endpoints from an EPG, or moving one or more endpoints from one EPG to another). In some embodiments, the network may utilize historical ground truth flows for simulating network traffic based on what if experiments. That is, the network may apply the addition or removal of policies and/or changes to EPGs to a simulated network environment that mirrors the actual network to evaluate the effects of the addition or removal of policies and/or EPG changes. The network can determine whether the policy changes break or misconfigure networking operations of any applications in the simulated network environment or allow any attacks to the simulated network environment that were previously thwarted by the actual network with the original set of policies. The network can also determine whether the policy changes correct misconfigurations and prevent attacks that occurred in the actual network. In some embodiments, the network can evaluate real time flows in a simulated network environment configured to operate with an experimental policy set or experimental set of EPGs to understand how changes to particular policies or EPGs affect network traffic in the actual network.

It should be understood that the data pipeline 400 is only an example and that stages may be added, combined, removed, or modified without departing from the scope of the various embodiments.

Figure 6:
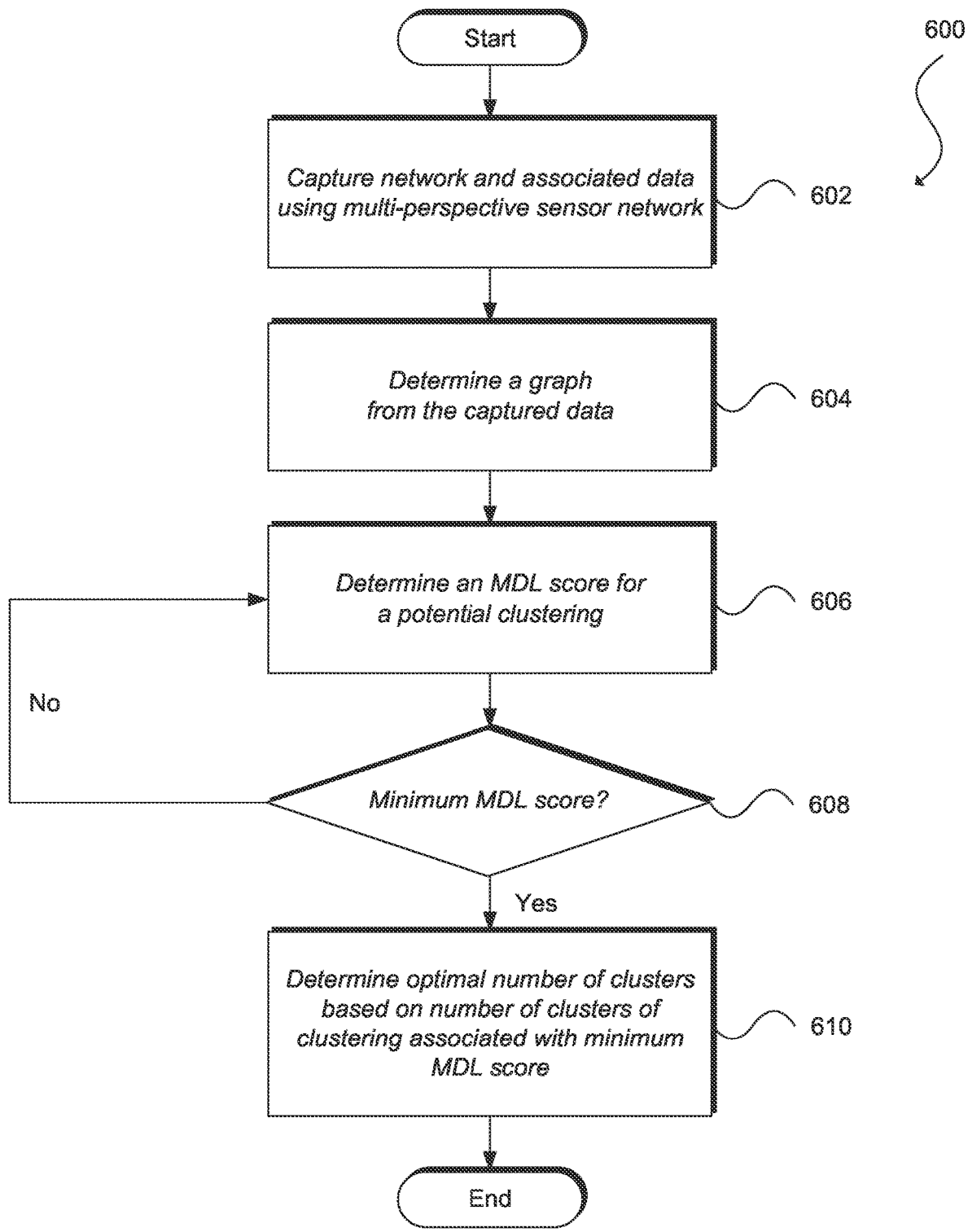
FIG. 6 illustrates an example of a process for determining clusters for application dependency mapping in accordance with an embodiment.

FIG. 6 illustrates an example of a process 600 for determining an optimal number of clusters for automated application dependency mapping in accordance with an embodiment. The process 600 can be performed by a network, and particularly, a network traffic monitoring system (e.g., the network traffic monitoring system 200 of FIG. 2), an analytics engine (e.g., the analytics engine 210 of FIG. 2), a network controller (e.g., the network controller 218 of FIG. 2), an ADM module (e.g., the ADM module 240 of FIG. 2), a network operating system, a virtualization manager, a network virtualization manager, or similar system.

In the embodiment of FIG. 6, the process 600 can begin at step 602 in which the network captures data for each node of the network (or at least for a monitored set of nodes) across multiple domains, such as a network domain, host domain, process domain, and/or user domain. In some embodiments, virtualization information, network topology information, and application information (e.g., configuration information, previously generated application dependency maps, application policies, etc.) may also be collected. In some embodiments, out-of-band data (e.g., power level, temperature, and physical location) and third party data (e.g., CMDB or CMS as a service, Whois, geocoordinates, etc.) can also be collected.

As discussed, a sensor network can collect the captured data from multiple perspectives to provide a comprehensive view of network behavior. The sensor network may include sensors at multiple nodes of a data path (e.g., network devices, physical servers) and within multiple partitions of a node (e.g., hypervisor, shared kernel, VM, container, etc.).

After collection of the multi-domain data, the process 600 may continue on to step 604, in which the network determines a communication graph from the data collected in step 602. The nodes of the graph can include source endpoints, destination endpoints, and destination ports identified in the captured data. The edges of the graph may correspond to observed traffic from the source endpoints to the destination endpoints at the destination ports.

At step 606, the network can determine an MDL score for a potential clustering. The MDL score for an individual clustering can be based on a sum of description length values for each cluster combination of the individual clustering (e.g., source cluster-destination cluster-port combination). The description length value for an individual cluster combination can be based on a number of observed edges of the graph and unobserved edges of the graph corresponding to the individual cluster combination.

After the network determines the MDL score for the potential clustering, the process 600 may proceed to decision point 608. At decision point 608, the network can determined whether the MDL score for the potential clustering is the minimum MDL score for all potential clusterings. If the currently analyzed clustering is not associated with the minimum MDL score, the process 600 may return to step 606 to analyze another potential clustering.

If the currently analyzed clustering is associated with the minimum MDL score, the process 600 may conclude at step 610 in which the optimum number of clusters for the network can be determined based on the number of clusters corresponding to the clustering associated with the minimum MDL score.

In some embodiments, a network may comprise multiple partitions in which clusters may not span the multiple partitions. The optimal clustering may vary from one partition to another in such networks. In some embodiments, the MDL principle can be used to improve the number of clusters for each individual partition by using a randomized local search algorithm based upon local searches. The network can determine an MDL score for each potential number of clusters for each of the multiple partitions (or at least until a change in energy is below a threshold change), and the determined number of clusters for each of the multiple partitions can correspond to the highest energy state (e.g., lowest MDL score) for a particular partition.

In some embodiments, an application dependency mapping determined by the network can be used to automatically generate policies, such as those based on whitelist rules. In some embodiments, the generated set of policies can be enforced in a simulated environment mirroring the network to determine the effects of changing a previous set of policies to the generated set of policies.

Figure 7A:
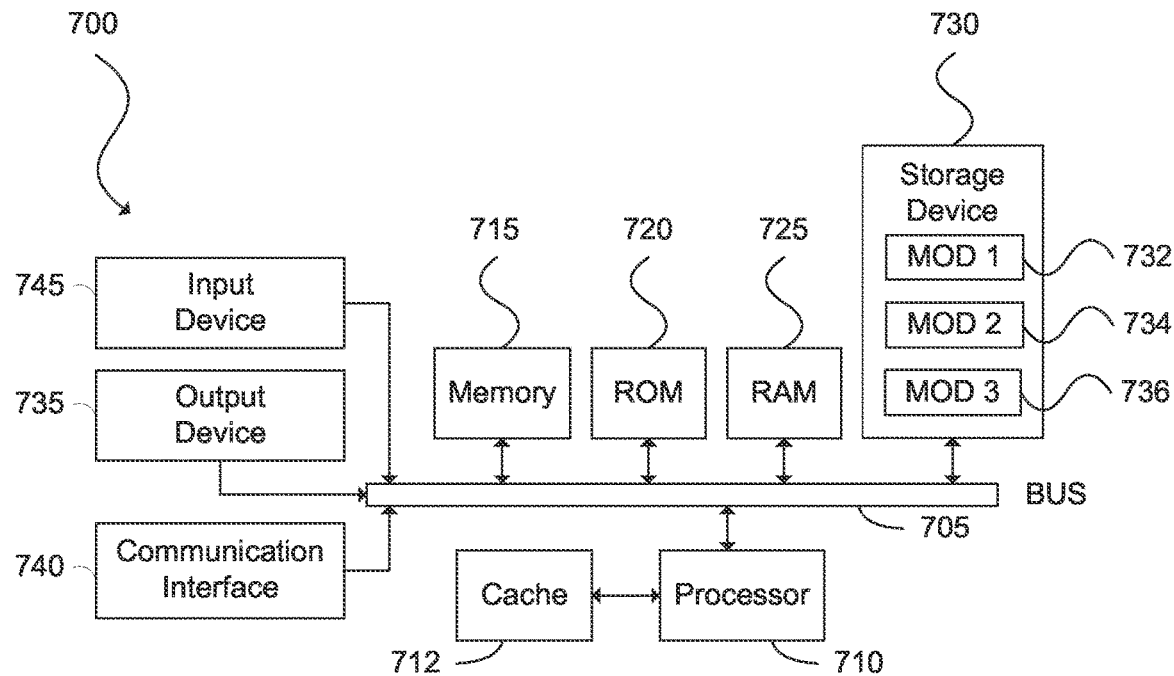
FIG. 7A and FIG. 7B illustrate examples of systems in accordance with some embodiments.
Figure 7B:
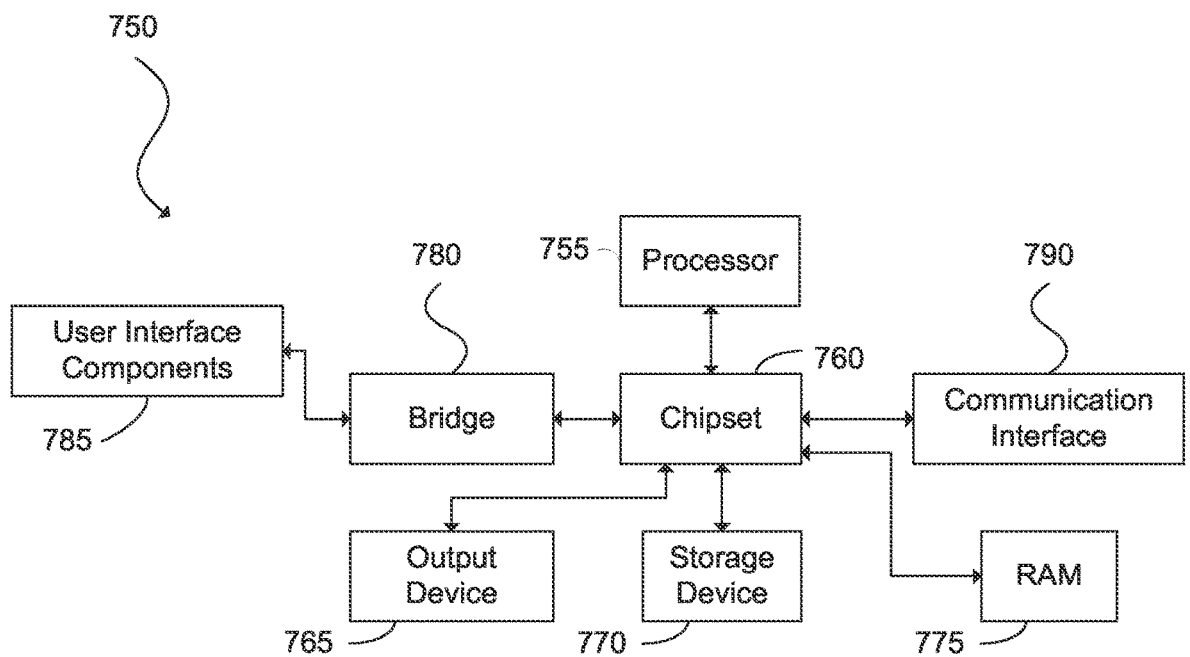

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a conventional bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 770 and random access memory (RAM) 775, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a conventional chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
capturing, at a collector associated with a network monitoring system, network flow data relating to a plurality of endpoints, wherein each endpoint is a virtual machine, wherein each endpoint of the plurality of endpoints sends and/or receives packets via a virtual network interface dedicated to the endpoint; and
analyzing the network flow data via a machine-learning based analytics engine, the analyzing comprising the steps of:
creating an application dependency graph, wherein nodes in the application dependency graph correspond to a first set of endpoints that function together as a first distributed application, and wherein edges the application dependency graph correspond to network flows described in the network flow data; and
creating at least one cluster of two or more nodes of the first distributed application based upon a similarity of their connections in the application dependency graph,
wherein the collector receives network flow data relating to at least one additional endpoint, wherein the at least one additional endpoint is selected from a group containing a container, a hypervisor, a server, a network device, an external network, or a service, and wherein the network flow data from the at least one additional endpoint is based upon packets being sent and/or received via a network interface dedicated to the at least one additional endpoint.

2. The method of claim 1, further comprising observing network packets being sent and/or received at each endpoint and sending network flow data describing the observed network flows to the collector.

3. The method of claim 1, wherein the collector receives network flow information relating to at least one additional endpoint located on a different network, segment, or tenant space.

4. The method of claim 1, wherein at least one cluster corresponds to a tier in the first distributed application.

5. The method of claim 1, wherein application dependency graph descriptions of the endpoints within each cluster of the at least one cluster have a similar minimum description length (MDL).

6. The method of claim 1, further comprising creating a second application dependency graph, wherein nodes in the second application dependency graph correspond to a second set of endpoints that function together as a second distributed application, and wherein edges in the second application dependency graph correspond to network flows described in the network flow data.

7. The method of claim 1, further comprising presenting a visual representation of the application dependency graph via a user interface.

8. The method of claim 1, wherein the network flow data is received and processed in substantially real time to map endpoints to applications.

9. The method of claim 8, wherein changes in the first distributed application are reflected in changes in the application dependency graph.

10. A network traffic monitoring system comprising:
a collector and a machine-learning based analytics engine, wherein the collector receives network flow data relating to a plurality of endpoints, wherein each endpoint of the plurality of endpoints is a virtual machine, wherein each endpoint of the plurality of endpoints sends and/or receives packets via a virtual network interface dedicated to the endpoint, and wherein the machine-learning based analytics engine is configured to:
analyze the network flow data to identify a first set of endpoints functioning together as a first distributed application, and create an application dependency graph, wherein nodes in the application dependency graph correspond to a first set of endpoints associated with the first distributed application and edges in the application dependency graph correspond to network flows described in the network flow data; and
create at least one cluster of two or more nodes of the first distributed application based upon a similarity of their connections in the application dependency graph,
wherein the collector receives network flow data relating to at least one additional endpoint, wherein the at least one additional endpoint is selected from a group containing a container, a hypervisor, a server, a network device, an external network, or a service, and wherein the network flow data from the at least one additional endpoint is based upon packets being sent and/or received via a network interface dedicated to the at least one additional endpoint.

11. The system of claim 10, wherein the system further comprises the plurality of endpoints.

12. The system of claim 10, wherein the collector receives network flow information relating to at least one additional endpoint located on a different network, segment, or tenant space.

13. The system of claim 10, wherein at least one cluster corresponds to a tier in the first distributed application.

14. The system of claim 10, wherein application dependency graph descriptions of the endpoints within a cluster of the at least one cluster have a similar minimum description length (MDL).

15. The system of claim 10, wherein a second set of endpoints correspond to a second distributed application.

16. The system of claim 10, further comprising a presentation module, the presentation module includes a user interface, and wherein the presentation module creates a visual representation of the application dependency graph via the user interface.

17. The system of claim 10, wherein the traffic data is captured and processed in substantially real time to map endpoints to applications.

18. The system of claim 17, wherein changes in the first distributed application are reflected in changes in the application dependency graph.

* * * * *